United States Patent
Hodgkins et al.

(10) Patent No.: US 12,491,699 B2
(45) Date of Patent: *Dec. 9, 2025

(54) ACOUSTIC ARTICLE, DECORATIVE ELEMENT, AND SYSTEMS COMPRISING SAME

(71) Applicant: SHAW INDUSTRIES GROUP, INC., Dalton, GA (US)

(72) Inventors: Clark Hodgkins, Dalton, GA (US); Barrett Morton, Dalton, GA (US); Julie Brumbelow, Dalton, GA (US); Thomas Odum, Dalton, GA (US); Dennis Hart, Dalton, GA (US); Joseph Michael Woodall, Ringgold, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/174,335

(22) Filed: Apr. 9, 2025

(65) Prior Publication Data

US 2025/0256483 A1 Aug. 14, 2025

Related U.S. Application Data

(63) Continuation of application No. 18/316,506, filed on May 12, 2023, now Pat. No. 12,304,188, which is a continuation-in-part of application No. PCT/US2022/051221, filed on Nov. 29, 2022.

(60) Provisional application No. 63/357,863, filed on Jul. 1, 2022, provisional application No. 63/295,163, filed on Dec. 30, 2021, provisional application No. 63/283,955, filed on Nov. 29, 2021.

(51) Int. Cl.
| | |
|---|---|
| B32B 27/18 | (2006.01) |
| B32B 5/02 | (2006.01) |
| B32B 5/26 | (2006.01) |
| B32B 7/022 | (2019.01) |
| B32B 7/12 | (2006.01) |
| B32B 13/12 | (2006.01) |
| B32B 13/14 | (2006.01) |
| B32B 21/08 | (2006.01) |
| B32B 21/10 | (2006.01) |
| B32B 27/08 | (2006.01) |
| G10K 11/168 | (2006.01) |

(52) U.S. Cl.
CPC .............. *B32B 7/022* (2019.01); *B32B 5/022* (2013.01); *B32B 5/024* (2013.01); *B32B 27/08* (2013.01); *B32B 27/18* (2013.01); *G10K 11/168* (2013.01); *B32B 5/26* (2013.01); *B32B 7/12* (2013.01); *B32B 13/12* (2013.01); *B32B 13/14* (2013.01); *B32B 21/08* (2013.01); *B32B 21/10* (2013.01); *B32B 2262/0253* (2013.01); *B32B 2262/0261* (2013.01); *B32B 2262/0276* (2013.01); *B32B 2307/102* (2013.01); *B32B 2307/536* (2013.01); *B32B 2307/72* (2013.01); *B32B 2307/724* (2013.01); *B32B 2307/7265* (2013.01); *B32B 2307/7376* (2023.05); *B32B 2471/00* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 12,304,188 B2 * | 5/2025 | Hodgkins | ............... B32B 7/022 |
| 2006/0216471 A1 | 9/2006 | Grah et al. | |
| 2006/0237130 A1 | 10/2006 | Thompson | |
| 2008/0001431 A1 | 1/2008 | Thompson et al. | |
| 2020/0189242 A1 | 6/2020 | Cai et al. | |
| 2023/0085014 A1 | 3/2023 | Mohan et al. | |

FOREIGN PATENT DOCUMENTS

| | | |
|---|---|---|
| EP | 1416105 | 5/2004 |
| WO | WO 2018/197597 | 11/2018 |
| WO | WO2023097110 A1 | 6/2023 |

OTHER PUBLICATIONS

International Search Report and Written Opinion were mailed on Apr. 26, 2023 by the International Searching Authority for International Application No. PCT/US22/51221 filed on Nov. 29, 2022 and published as WO2023097110 (Applicant—Shaw Industries Group) (14 pages).

International Search Report and Written Opinion was issued on Oct. 8, 2024 by the International Searching Authority for International Application No. PCT/US2024/28805 filed on May 10, 2024 and published as WO2024238336 (Applicant—Shaw Industries Group, Inc) (20 pages).

* cited by examiner

*Primary Examiner* — Sheeba Ahmed

(74) *Attorney, Agent, or Firm* — Ballard Spahr LLP

(57) ABSTRACT

Acoustic articles, decorative elements, and system containing the same can include a decorative element having a first side and an opposing second side, and an acoustic article coupled to the opposing second side of the decorative element. The acoustic article can include an entangled fiber structure. The acoustic article can have a thickness of at least 0.4 mm, and can compress less than 25% of the thickness thereof when subjected to a pressure of 2 lbf/in$^2$.

30 Claims, 9 Drawing Sheets

| # | Product | STC | IIC | HIIC |
|---|---------|-----|-----|------|
| 1 | 7mm WPC with 1.5mm Foam Pad | 53 | 52 | 60 |
| 2 | 2-4mm LVT with 1.5mm Foam Pad | 53 | 52 | 55 |
| 3 | 5mm LVT with 1.5mm Foam Pad | 53 | 52 | 55 |
| 4 | 5mm LVT with 1.5mm Foam Pad | 53 | 52 | 55 |
| 5 | 5.5mm WPC with 3mm Crumb Rubber Pad | 53 | 56 | 59 |
| 6 | 5.5mm WPC with 4mm Foam Rubber Pad | 53 | 57 | 65 |
| 7 | 4mm SPC with 1.5mm Foam Pad | 53 | 57 | 62 |
| 8 | 4mm SPC T&G - 5oz PP pad | 51 | 57 | 61 |
| 9 | 4mm SPC T&G - 6oz PP pad | 51 | 57 | 64 |
| 10 | 4mm SPC T&G - 7oz PP pad | 51 | 58 | 67 |
| 11 | 6.5mm WPC with 15oz Plush Logix (Kentier) | 53 | 59 | 70 |
| 12 | 4mm SPC T&G - on 12oz FLW (15 dpf) | 53 | 59 | 69 |
| 13 | 4mm SPC T&G - on 7oz FLW (5 dpf) | 53 | 59 | 65 |
| 14 | 4mm SPC T&G - on 15oz Air Lay Logix | 53 | 61 | 74 |

FIG. 8

| Flooring on 6 inch concrete slab) | IIC | HIIC |
|---|---|---|
| 4 mm T&G SPC Luxury Vinyl Plank | 44 | 41 |
| 4 mm T&G SPC Luxury Vinyl Plank over 1.4 mm foam mat | 57 | 62 |
| Tile over 10 mm recycled crumb rubber mat | 50 | 52 |
| SoundScape (SPC with integrated matting) | 56 | 63 |
| Wood flooring over 10 mm recycled crumb rubber mat | 53 | 59 |
| Carpet Tile (EcoWorx) | 57 | 64 |
| Carpet Tile (EcoLogix) | 66 | 88 |
| 4 mm T&G SPC Luxury Vinyl Plank over 4 mm novel 15 oz. PET non-woven matting | 61 | 74 |

Rows grouped as: No underlay or related underlay (rows 1–5); Carpet (rows 6–7); System 10 (row 8).

FIG. 9

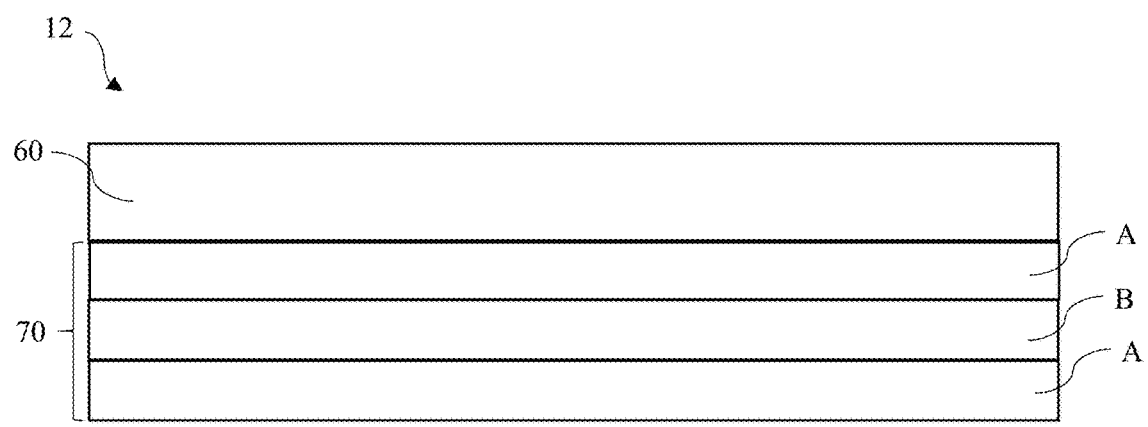

FIG. 10

ACOUSTIC ARTICLE, DECORATIVE ELEMENT, AND SYSTEMS COMPRISING SAME

CROSS-REFERENCE TO RELATED APPLICATIONS

This is a continuation of U.S. patent application Ser. No. 18/316,506, filed May 12, 2023, which is a continuation in part of PCT Application No. PCT/US2022/51221, filed Nov. 19, 2022, which claims the benefit of the respective filing dates of U.S. Provisional Patent Application Nos. 63/357,863, filed Jul. 1, 2022, 63/295,163, filed Dec. 30, 2021, and 63/283,955, filed Nov. 29, 2021, the entirety of each of which is hereby incorporated by reference herein for all purposes.

FIELD

This application relates generally to acoustic articles and decorative units comprising the same.

BACKGROUND

Decorative elements can form aesthetic surfaces for various environments or can be applied as skins to cover various sub structures to achieve a desired aesthetic and/or functional purpose. Such decorative elements are often used in residential and commercial spaces.

Acoustics in interior spaces are a concern for building manufacturers as well as the users of the interior spaces. For example, it can be desirable to minimize sound between adjacent rooms that share a surface structure (e.g., wall/floor/ceiling). Similarly, it can be desirable to minimize sound transferred between adjacent stories of a building through the shared surface structures (e.g., wall/floor/ceiling).

SUMMARY

Disclosed herein, in one aspect, is a system comprising a decorative element having a first side and an opposing second side. The decorative element has a first surface on the first side and a second surface on the opposing second side. An acoustic article is disposed on the opposing second side of the decorative element. The acoustic article comprises a resiliently compressible material; has a thickness of at least 0.4 mm; and is compressible by less than 25% of the thickness when subjected to a pressure of 2 lbf/in$^2$. A stiffening structure is positioned between the decorative element and the acoustic article.

Also disclosed herein, in various aspects, is a decorative unit comprising a decorative element having a first side and an opposing second side. The decorative element has a first surface on the first side and a second surface on the opposing second side. An acoustic article is disposed on the opposing second side of the decorative element. The acoustic article comprises a resiliently compressible material; has a thickness of at least 0.4 mm; and is compressible by less than 25% of the thickness when subjected to a pressure of 2 lbf/in$^2$. A stiffening structure is positioned between the decorative element and the acoustic article.

Also disclosed herein, in various aspects, is subsurface article comprising an acoustic article comprising a resiliently compressible material. The acoustic article has a first side defining a first surface and an opposing second side defining a second surface. The acoustic article comprises a resiliently compressible material; has a thickness of at least 0.4 mm; and is compressible by less than 25% of the thickness when subjected to a pressure of 2 lbf/in$^2$. The subsurface article further comprises a stiffening structure is positioned on the first side of and, optionally, disposed on the first surface of the acoustic article. When the subsurface article is disposed below a decorative element, the stiffening structure is positioned between the decorative element and the acoustic article.

Methods of using the systems, decorative units, and subsurface articles are also disclosed.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiments of the invention will become more apparent in the detailed description in which reference is made to the appended drawings wherein:

FIGS. 8 and 9 illustrate acoustic properties of an exemplary system disclosed herein as compared to other conventional decorative element systems.

FIG. 10 illustrates an exemplary decorative element comprising a decorative portion and a substrate.

DETAILED DESCRIPTION

Figure 1:
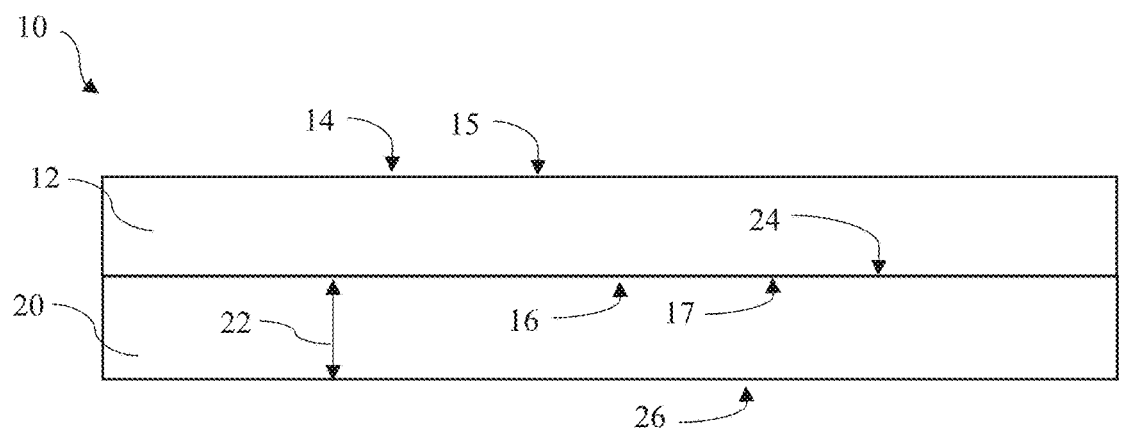
FIG. 1 is a schematic diagram of a system comprising a decorative element and an acoustic article as disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a layer" includes one or more of such layers, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein are acoustic articles, decorative elements, and systems comprising the same. The decorative elements can form both functional and aesthetic surfaces for various environments. For example, the decorative elements can form a floor, wall, or ceiling surface. The acoustic article along with the decorative element can have additional advantages such as, but not limited to, acoustic advantages, underfoot comfort advantages, etc., as will be discussed in greater detail below.

Referring to FIG. 1, an exemplary system 10 comprises a decorative element 12 having a first side 14 and an opposing second side 16. The decorative element has a first surface 15 on the first side 14 and a second surface 17 on the opposing second side 16. An acoustic article 20 is configured to be disposed on the opposing second side 16 of the decorative element 12. In further aspects, the acoustic article 20 is disposed on the opposing second side 16 of the decorative element 12. In some optional aspects, the acoustic article 20 can be coupled to the second surface 17 of the decorative element 12. In other optional aspects, the decorative element 12 can be positioned against, but not coupled to the acoustic article. In other aspects, and as further described herein, one or more layers or structures can be disposed between the decorative element 12 and the acoustic article 20. The acoustic article 20 has a thickness 22 between a first side 24 and an opposed second side 26. In some aspects, the acoustic article 20 can be integrally attached to the decorative element 12, whereas in other aspects, the decorative element 12 can be disposed on top of an already installed acoustic article 20. In yet other aspects, the acoustic article 20 may be embedded within the decorative element 12.

As used herein, "decorative element," "hard surface flooring material," "hard surface floor panel," and "floor panel" are used interchangeably and should be understood to have the same scope and meaning. For example, the term "decorative element" should be understood to mean a hard surface flooring material.

As used herein, "acoustic article" and "base pad" are used interchangeably and should be understood to have the same scope and meaning. For example, the term "acoustic article" should be understood to mean a base pad.

As used herein, "decorative unit" and "flooring element" are used interchangeably and should be understood to have the same scope and meaning. For example, the term "decorative unit" should be understood to mean a flooring element.

As used herein, "entangled fiber structure" should be understood to be defined as a woven material, a non-woven material, and a combination thereof.

In one example, the system 10 disclosed herein can be a hard surface floor panel 12 configured to be connected to another hard surface floor panel 12 (hereinafter "floor panel"). As such, the floor panel 12 can be configured to be connectable to or interlocked with the floor panel 12 of another system. For example, floor panel 12 can have tongue and groove connections. The tongue of one floor panel 12 can be connected to a groove on another floor panel 12.

The base pad 20 can comprise a resiliently compressible material. Optionally, the resiliently compressible material can comprise, an entangled fiber structure (i.e., woven material, a non-woven material, or a combination thereof). In other aspects, the base pad 20 can comprise any suitable material that provides the desired material properties. For example, the base pad 20 can comprise a foam, rubber, or composite. In some aspects, resiliently compressible material can comprise, or be, cork. In exemplary aspects, the base pad 20 has a thickness 22 that can be from about 0.4 mm to about 25 mm. Further, the base pad 20 can be configured to compress by less than 25% of the thickness 22 when subjected to a pressure of 2 lbf/in$^2$ (pounds-force per square inch).

In exemplary aspects, the thickness 22 can be about or at least 0.4 mm, about or at least 0.5 mm, about or at least 0.7 mm, about or at least 1 mm, about or at least 1.5 mm, about or at least 2.5 mm, about or at least 5.0 mm, about or at least 7.5 mm, about or at least 10 mm, about or at least 15 mm, about or at least 20 mm, about or at least 25 mm, or from about 0.4 mm to about 25 mm, or from about 0.4 mm to about 7 mm, or from about 0.5 mm to about 25 mm, or from about 0.5 mm to about 7 mm, or from about 0.7 mm to about 25 mm, or from about 1.0 mm to about 10 mm, or from about 1.6 to about 5 mm. In some embodiments, the thickness can be from about 3 mm to about 4.5 mm, or about 3.75 mm.

It is contemplated that the base pad 20 can have a thickness tolerance that corresponds to a deviation in thickness that does not inhibit use of the base pad 20 with the floor panel 12. For example, a variation in thickness between two adjacent pads at opposite ends of the thickness tolerance can permit respective floor panels 12 to engage each other (e.g., via tongue and groove or other locking system). It was discovered that the base pad 20 disclosed herein can have an exceptionally high thickness tolerance without inhibiting coupling between adjacent floor panels 12 or without significantly compromising the locking strength or integrity between the respective floor panels 12. This discovery was a surprising and unexpected result. For example, the compressibility of the base pad 20 permits alignment and coupling of the adjacent floor panels 12. It is further contemplated that the coupling between coupled floor panels 12 can permit flexing to accommodate the compressibility of the base pad 20. In some aspects, the base pad 20 can have a thickness tolerance of less than 1 mm, or less than 0.5 mm, or about 0.4 mm. In further aspects, the base pad can have a thickness tolerance of at least 0.2 mm, or at least 0.3 mm, or at least 0.4 mm, or at least 0.5 mm, or at least 0.75 mm, or at least 1 mm, or more. In some optional aspects, the thickness tolerance of the base pad can be from about 0.3 to about 1 mm. In some optional aspects, the thickness tolerance of the base pad can be from about 0.3 to about 0.5 mm. In some optional aspects, the thickness tolerance of the base pad can be from about 0.3 to about 4 mm. In some exemplary aspects, the base pad 20 can have a thickness of about 3.75 mm+/−0.4 mm. That is, the base pad 20 can have a thickness of 3.35 mm-4.15 mm.

In some optional aspects, the base pad 20 can be configured to compress by less than 20%, 15%, 10%, or 5% of the thickness 22 when subjected to a pressure of 2 lbf/in$^2$.

In some aspects, the floor panel 12 can comprise polymer. For example, in some aspects, the floor panel 12 can comprise polyvinylchloride. In exemplary aspects, the floor panel 12 can comprise vinyl tile. In further aspects, the floor panel 12 can comprise wood. In yet further aspects, the floor panel 12 can comprise cementitious panel subfloor. In yet further aspects, the floor panel 12 can comprise a gypsum subfloor. In further aspects, the floor panel 12 can comprise self-leveling flooring material (e.g., a gypsum-type or other cementitious floor topping with tile or other flooring material thereon). In some aspects the floor panel 12 can be flexible and/or resilient. In some aspects, the floor panel 12 can include, but is not limited to, laminate, engineered, luxury vinyl tile (LVT), luxury vinyl plank (LVP), and/or solid wood hard surface products.

In some aspects, the floor panel 12 can have a thickness from about 1 mm to about 15 mm. For example the floor panel 12 can have a thickness from about 2 mm to about 10 mm, or from about 2 mm to about 8 mm, or from about 2 mm to about 6 mm, or from about 3 mm to about 5 mm, for example about 4 mm.

In various optional aspects, the floor panel 12 can have a width from about 4 inches to about 24 inches. For example, in some aspects, the floor panel 12 can have a width from about 5 inches to about 10 inches. In various optional aspects, the floor panel 12 can have a length from about 24 inches to about 72 inches. In exemplary aspects, the floor panel can have a width from about 5 inches to about 10 inches and a length from about 24 inches to about 72 inches. The floor panel 12 can have a rectangular shape. The floor panel 12 can have a square shape.

Although generally described herein as a floor panel, in various aspects, embodiments disclosed herein in accordance with the floor panel 12 can be a decorative hard surface element that serves as floor, wall, or ceiling coverings. In various aspects, the floor panel 12 and the base pad 20 can cooperate to form a decorative unit.

In exemplary aspects, the base pad 20 can comprise a nonwoven material. The nonwoven material can comprise as sheet or web structure bonded together by entangling fiber or filaments (and by perforating films) mechanically, thermally or chemically. For example, the nonwoven material can comprise needlebond or spun bond material. In some aspects, the nonwoven material can comprise polyethylene, polypropylene, polyester, nylon, polystyrene, polylactic acid, or a combination thereof. In some aspects, the nonwoven material can comprise, or consist of, or consist essentially of recycled polymer (post-industrial, post-consumer, etc.). In other aspects, the nonwoven material can comprise virgin polymer.

In further aspects, the base pad 20 can comprise a woven material. Woven materials have the appearance of two-sets of parallel threads interlaced at generally right angles to each other in the plane of the material. "Warp" yarns lie along the length of the material and "weft" yarns lie in the transverse direction, i.e. extending along the width of the material. The type of fibers used to produce a woven textile can be monofilament, multifilament, a combination of each type, or slit film yarns. In some aspects, the woven material can be tape-spun, wherein the term "tape-spun" yarn refers to yarn having a slit film yarn in the warp direction and spun (relatively short staple length) yarn in the weft direction. In some aspects, the woven material can be tape-tape, wherein "tape-tape" yarn refers to yarn having a slit film yarn both in the warp and the weft directions.

In exemplary aspects, the base pad 20 does not have any filler dispersed therethrough. Accordingly, in some aspects, the base pad 20 can comprise a material that defines open space (e.g., air pockets) therein that are not filled with filler. This can contrast to, for example, a material defining pockets and a filler dispersed through the material and at least partially fills the pockets and can diminish acoustic performance qualities of the base pad. In various optional aspects, the base pad 20 can comprise, consist of, or consist essentially of, nonwoven material and air dispersed therethrough.

In still further aspects, the base pad 20 can comprise a filler. Suitable fillers include, but are not limited to, coal fly ash, calcium carbonate, iron oxide, barium sulfate, silica, carbon black, graphite, talc, titanium dioxide, or any other filler known in the art. The filler can impact the reduce the size or number of air pockets within the base pad 20. Still further, the filler can control the consistency of the base pad and can reduce cost.

In exemplary aspects, the base pad 20 can comprise a plurality of fibers (e.g., nonwoven material), wherein at least a portion of the fibers can be vertically oriented. Such fibers can help to decouple the floor panel 12 from the surface below the base pad (e.g., subfloor) for improved acoustic performance. For example, the vertically oriented fibers can resiliently space the floor panel 12 from the surface below the base pad 20 so that impacts against the floor panel 12 are at least partly attenuated, rather than transferring the impact directly to the surface below.

In some optional aspects, the fibers of the entangled fiber structure of the base pad 20 can have a denier at or above 12. For example, in some aspects, the denier (per filament, or dpf) of the fibers of the entangled fiber structure of the base pad 20 can be about 15. In further optional aspects, some or all of the fibers of the base pad 20 can have a denier below 12. In yet further aspects, the denier of the fibers can be from about 4 to about 30, such as from about 6 to about 20, or from about 8 to about 15.

In some optional aspects in which the base pad 20 comprises nonwoven material, the fibers of the nonwoven material can comprise a first plurality of fibers having a first melting point and a second plurality of fibers having a second melting point that is greater than the melting point of the first plurality of fibers. For example, said first and second plurality of fibers can form a fiber batt (e.g., optionally, a nonwoven fiber batt). The first and second plurality of fibers can optionally be intermixed and entangled. The combination of fibers with different melting points (e.g., normal melt and low melt polymers) can improve the compressive strength of the base pad 20 under a floor panel 12 while maintaining acoustic performance.

In some example embodiments, the base pad 20 can optionally comprise a spunbond material. The spunbond material can be produced by depositing extruded, spun filaments onto a collecting belt in a uniform, random manner followed by bonding the fibers. For example, the extruded, spun filaments can be deposited in a consistent weight but in a random fashion. The extruded, spun filaments can be extruded onto a belt moving at a constant speed. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspects, the spunbond material can comprise mono-component filament, which can be relatively inexpensive as compared to bi-component filament. In other aspects, the spunbond material can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyamide, polyethylene, or polyester. In yet further aspects, the sheath polymer comprises nylon. In still further aspects, the base pad comprises a polyester as a core component and nylon as a sheath component.

In some aspects in which the base pad comprises nonwoven material, the nonwoven material can comprise needlebond (e.g., structured needlebond). The needlebond can have barbed needles penetrated therethrough to form a stabilized web structural integrity. The needlebond can optionally be highly textured and have a coarse denier.

Optionally, the base pad 20 can comprise a single layer. In further aspects and with further reference to FIG. 2, the base pad 20 can comprise a plurality of layers. For example, the base pad 20 can comprise two layers, three layers, four layers, or more. In some aspects, the base pad 20 can comprise a first layer 30 and a second layer 32. The first layer 30 can be disposed between the second layer 32 and the floor panel 12. In some aspects, the first layer 30 can be positioned adjacent the second surface 17 of the floor panel 12.

Optionally, at least one layer of the plurality of layers of the base pad 20 can have a density that is different from another layer of the plurality of layers of the base pad 20. For example, the first layer 30 of the base pad 20 can have a first density and the second layer 32 of the base pad 20 can have a second density that is less than the first density. In this way, the first layer 30 can serve as a cap layer that holds an adhesive 34 for coupling the base pad 20 to the floor panel 12. The relatively greater density of the first layer 30 can inhibit undesirable excess permeation of the adhesive 34 through the base pad 20. In some aspects, the first density can be at least 10%, at least 20%, at least 30%, at least 40%, at least 50%, at least 100% greater than the second density. In some examples, the first layer 30 of the base pad 20 can have a lower density than the second layer 32.

In some optional aspects, the base pad 20 can comprise at least one layer comprising nonwoven material and at least one layer comprising woven material. For example, the first layer 30 can be a woven material and the second layer 32 can be a non-woven material. In some aspects, the first layer 30 comprising woven material can be positioned facing to the second surface 17 of the floor panel 12. In this way, the first layer 30 can serve as a cap layer that holds an adhesive 34 for coupling the base pad 20 to the floor panel 12. For example, the first layer comprising a woven material can have smaller pores than a non-woven, thereby inhibiting penetration of adhesive. Still further, the first layer 30 comprising the woven material can enable adhesive to be easily spread thereon. In this way, the adhesive can be applied more easily and in a controlled quantity, as compared to being spread on a non-woven material. Still further, the first layer 30 comprising woven material can inhibit penetration of the adhesive to the subfloor or to lower layer(s), second layer 32, that diminish the properties (e.g., flexibility or resilience) of the lower layer(s). For example, penetration of the adhesive can fill air gaps in the non-woven material, thereby changing the compression characteristics of the non-woven material and diminishing the effectiveness of the non-woven material. Still further, the first layer 30 comprising woven material can provide rigidity to the base pad. For example, the woven material can inhibit elongation in one or both of warp and weft directions. Said rigidity can be advantageous during installation, particularly so for double-stick embodiments (described below). In further aspects, the first and second layers 30, 32 can both comprise nonwoven materials. In further aspects, the first and second layers 30, 32 can both comprise woven materials. In some example embodiments, the first layer 30 can comprise a non-woven material and the second layer 32 can comprise a woven material.

In some aspects, the system 10 can be a double stick system. For example, a first adhesive can couple the base pad 20 to the subfloor, and a second adhesive can couple the base pad 20 to the flooring panel 12. Optionally, the first adhesive can be nonpermanent, and the second adhesive can be permanent. Exemplary adhesives can include SHAW 200 resilient adhesive provided by Shaw Industries Group, Inc. of Dalton, GA.

Optionally, adjacent layers can be coupled together via adhesive. In further aspects, adjacent layers can be coupled together via fiber entanglement. For example, in some aspects, the first and second layers 30, 32 can be integrally formed as a composite to form base pad 20. For example, the composite material can comprise a woven material as the first layer 30 and a nonwoven layer as the second material 32. In exemplary aspects, the first and second layers 30, 32 can be provided as a fiber lock weave or "FLW." FLW is a (fabric) material that includes fibers needle punched into it. The adhesive 34 can be disposed between the woven material and the floor panel 12. The woven material can advantageously distribute the load of the floor panel 12 to the nonwoven material. The woven material can further provide different mechanisms to achieve sufficient dimensional stability. Woven material can comprise warp and weft threads or yarns that provide greater strength in a planar direction as compared to non-woven material. Strength of the woven material can be determined by yarn type, yarn count, fiber density, stiffness, fiber type, weave density, etc.

The first layer 30 of the base pad 20 can have a first side 40 that faces and opposes the floor panel 12 and an opposed second side 42. Optionally, the first side 40 can have a surface profile that is different from the surface profile of the second side 42. For example, the surface profile of the second side 42 can comprise a plurality of fibers (e.g., optionally, stray ends of fibers) that provide a shallow decreasing fiber density (in terms of change in fiber density per change in thickness) in a direction away from the second side 42 and toward the first side 40, whereas the first 40 side has a surface profile that defines a more sharply decreasing fiber density in a direction away from the first side. In this way, the second side 42 can be fuzzier than the first side 40. It is contemplated that the fuzzier second side 42 can preferably face away from the floor panel 12 so that the first side 40 can receive adhesive without permitting undesired amount of adhesive permeation. In exemplary aspects, the first layer 30 can comprise dilour nonwoven material. In these aspects, optionally, the first layer 30 can be the only layer of the base pad 20. In further aspects, the base pad 20 can comprise two or more layers, with the first layer 30 adjacent to the floor panel 12.

Figure 3:
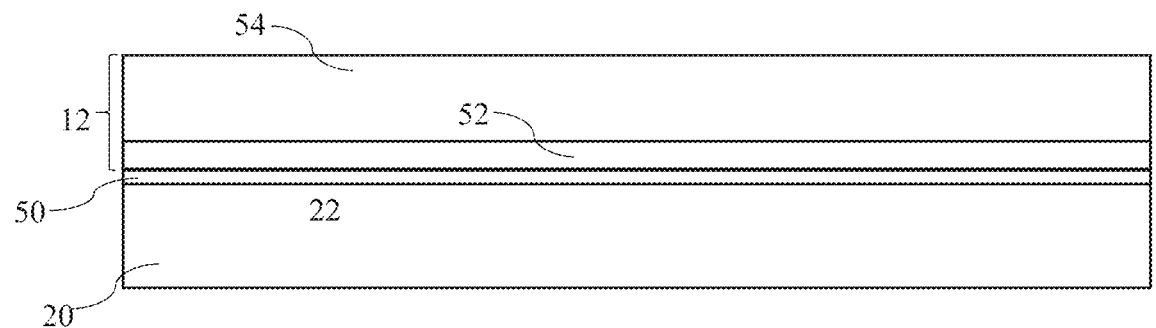
FIG. 3 is a schematic diagram of a system comprising a barrier and a leveling material thereon.

Referring to FIG. 3, in some aspects, a barrier 50 (e.g., a film layer) can be disposed between the base pad 20 and the floor panel 12. The barrier 50 can optionally be liquid-impermeable. In this way, a leveling material 52 can be positioned on the barrier 50. A tile or other surfacing material 54 can be positioned on top of the leveling material 52 (opposite the barrier 50). Optionally, the barrier 50 can be breathable (e.g., a semipermeable fluid barrier). Optionally, the base pad 20 can be treated for water repellency. In these aspects, the base pad 20 can optionally receive leveling material 52 applied directly thereon. Optionally, the barrier can be coupled to the base pad 20. In further aspects, the barrier 50 can be a separate component that is placed onto the base pad 20 prior to application of the leveling material 52.

As described herein, the term "semipermeable" refers to materials that do not allow certain substances to permeate but do allow certain other specified materials to pass through it. For example, and without limitation, a semipermeable fluid barrier can be permeable to gases and impermeable to liquids, or vice versa. As described herein, the term "impermeable" refers to materials that do not allow the disclosed substances to pass through it. For example, and without limitation, a fluid impermeable material can be impermeable to both liquids and gases. Liquid permeable can be impermeable to liquid but can optionally be permeable to gasses.

In some aspects, the barrier 50 can comprise a polymer film. In these aspects, the polymer film can comprise a thermoplastic material. In yet other aspects, the polymer film is a thermoplastic film. In other aspects, the polymer film comprises polymers and copolymers of polyethylene, polypropylene, polyurethane, polyester, polyvinylchloride, nylon and polyethylene vinyl acetate. In yet other aspects, the polymer film comprises polyethylene, polypropylene, polyurethane, polyester, or polyvinylchloride, or a combination thereof. In a yet further aspect, the polymer film is polyethylene. In yet further aspects, the polymer film is a combination of polyethylene and polyester.

In certain aspects, the polymer film is an extruded film. In yet other aspects, the polymer film is a blown film. In a yet further aspect, the polymer film is a cast film. In a still further aspect, the polymer film is an engineered film. The term "engineered film" as used herein refers to a polymer film comprising same or different polymers and copolymers, wherein the film is formed by various techniques to ensure desirable properties. In some aspects, the engineered film is a reinforced film. In some aspects, and without limitation, the engineered reinforced film can comprise a plurality of layers of the same or different polymer or copolymer. In other aspects, the engineered film can comprise layers of polyethylene film sandwiched with a layer of polyester. In yet further aspects, the engineered film can comprise layers of polyethylene and polypropylene, or layers of polyethylene and chemically resistant ethylene vinyl alcohol (EVOH) copolymer. In certain aspects, the engineered film used in the current disclosure can be purchased from Raven Industries.

In still further aspects, the polymer film is a composite film comprising polyethylene and polypropylene. In yet other aspects, the polymer film can comprise a polypropylene core. In yet other aspects, the polymer composite film can comprise at least two layers. In other aspects, the polymer composite film can comprise at least three layers. It is understood that each layer of the polymer composite film can be same or different and can comprise any of the polymers listed above. In some aspects, the composite film comprises at least three layers, and wherein each outer layer of the composite film comprises polyethylene.

In some aspects, the polymer film disclosed herein is a fluid barrier. In yet other aspects, the polymer film is fluid impermeable. In yet other aspects, the polymer film is semipermeable material. In certain aspects, the polymer film is semipermeable to gases. In some aspects, the polymer film is semipermeable to all atmospheric gases. In exemplary aspects and without limitation, the polymer film is semipermeable to oxygen, hydrogen, carbon dioxide, carbon oxide, nitrogen, and the like. In yet other aspects, the polymer film is impermeable to gases. In certain aspects, the polymer film is impermeable, for example, and without limitations, to volatile organic compounds (VOCs), methane, carbon dioxide, carbon oxide, radon, gasoline, benzene and the like. In yet further aspects, the polymer film is impermeable to the vapors.

In certain aspect, the polymer film is impermeable to fluids. In one aspect, the polymer film is impermeable to aqueous fluids. In another aspect, the polymer film is impermeable to non-aqueous fluids. In a further aspect, the non-aqueous fluid is an organic fluid. In further exemplary aspects, the polymer film is impermeable to water, carbonate and non-carbonate beverages, juices, milk, wine, or any other alcohol substances, human or pet bodily fluids, food fluids, food processing fluids, rain, or snow.

As disclosed herein, in some aspects, the polymer film can have a thickness of less than about 6 mils. In other aspects, the polymer film can have a thickness of exemplary values of about 5.5 mils, about 5 mils, about 4.5 mils, about 4 mils, about 3.5 mils, about 3 mils, about 2.5 mils, about 2 mils, about 1.5 mils, about 1 mil, and about 0.5 mils. In other aspects, the polymer film can have a thickness in any range derived from any two of the above stated values. For example, and without limitation the polymer film can have thickness from about 1 mil to about 5.5 mils, or from about 2 mils to about 4 mils, or from about 1 mil to about 3.5 mils.

In other aspects, the polymer film can have a thickness greater than 6 mils, although increasing thickness can correspond to increasing cost. For example, in some aspects, the polymer film can have a thickness of greater than about 10 mils. In other aspects, the polymer film can have a thickness of exemplary values of about 10 mils, about 15 mils, about 20 mils, about 25 mils, about 30 mils, about 35 mils, about 40 mils, about 45 mils, about 50 mils, about 55 mil, about 60 mils, about 65 mils, about 70 mils, about 75 mils, about 80 mils, about 85 mils, about 90 mils, and about 100 mils. In other aspects, the polymer film can have a thickness in any range derived from any two of the above stated values. For example, and without limitation the polymer film can have thickness from about 10 mils to about 40 mils, or from about 30 mils to about 50 mils, or from about 30 mil to about 80 mils.

In some aspects, the polymer film is continuous. In other aspects, the polymer film is substantially free of perforations or pinholes. In yet other aspects, the polymer film is continuous and substantially free of perforations.

In some aspects, the base pad 20 can have a density from about 4.5 lb/ft$^3$ to about 30 lb/ft$^3$, from about 6 lb/ft$^3$ to about 20 lb/ft$^3$, or from about 8 lb/ft$^3$ to about 12 lb/ft$^3$ (e.g., about 9 lb/ft$^3$). In exemplary aspects, the base pad 20 can comprise a nonwoven material, wherein the nonwoven material has a density from about 4.5 lb/ft$^3$ to about 30 lb/ft$^3$, from about 6 lb/ft$^3$ to about 20 lb/ft$^3$, or from about 8 lb/ft$^3$ to about 12 lb/ft$^3$ (e.g., about 9 lb/ft$^3$). Such high densities can be advantageous for providing sufficient support to prevent fatigue fractures of the floor panel 12.

In some optional aspects, the base pad 20 can compress by 25% when subject to a pressure from 2.1 lbf/in$^2$ to about 10 lbf/in$^2$. In some optional aspects, the base pad 20 can compress by less than 20%, 15%, 10%, or 5% when subject to a pressure of 2 lbf/in$^2$. In further aspects, the base pad 20 can comprise a nonwoven material, wherein the nonwoven material is compressible by 25% when subject to a pressure from 2.1 lbf/in$^2$ to about 10 lbf/in$^2$, such as a pressure of 3 lbf/in$^2$, 4 lbf/in$^2$, 5 lbf/in$^2$, 6 lbf/in$^2$, 7 lbf/in$^2$, 8 lbf/in$^2$ 9 lbf/in$^2$, or 10 lbf/in$^2$. In further aspects, said nonwoven material can compress by less than 20%, 15%, 10%, or 5% when subject to a pressure of 2 lbf/in$^2$.

Hard surface flooring (hereinafter, also "hard flooring") is increasingly replacing carpet in buildings such as condominiums, apartments, and offices. Unlike carpet, hard flooring promotes undesirable sound (particularly, that which is transmitted to the downstairs floor below) when subject to impact such as walking, pet movement, furniture placement, etc. Accordingly, as carpet is replaced with hard flooring, activities consistent with normal use such as walking, moving chairs, and accidentally dropping items that would generate little to no appreciable noise on carpeted surfaces now conduct significant noise from the hard flooring, through the ceiling of the downstairs floor below.

Many building codes mandate particular acoustical performance requirements for impact sound. Further, beyond code minimums, people generally prefer maximal acoustic performance to isolate sound generated by upstairs neighbors, and residents often prefer or demand performance beyond code minimums.

An underlayment, whether integral to or installed beneath a hard flooring product, can be used to reduce the noise impacts from one space to another and to increase sound absorption within a space. The fundamental design challenges of a resilient matting that is integral to or in addition to a finish floor is a balance between the acoustical performance and the structural integrity of the system. The system must have the ability to withstand the loading of objects, be comfortable to walk on, etc., but must also be effective at reducing the sound from impacts in the floor ceiling assembly. Further, the system needs to be as low in profile (i.e. height) as possible, since traditional floor installations are subject to real world conditions like door opening and closing, transitions between different finish materials, etc. Traditionally, this has limited the acoustical performance of the materials within a particular level of design.

There are several acoustical ratings that are used to measure and evaluate impact noise (higher ratings correspond to better sound insulation). Impact Insulation Class or IIC is the traditional rating; most building codes require a minimum rating of IIC 50 for separating floor-ceiling assemblies in multifamily residential properties. High-frequency Impact Insulation Class or HIIC is a new acoustical rating that measures impact noise in the high-frequency range (400-3150 Hz), which is the frequency range that describes the isolation provided by flooring and resilient matting products. Noise in the high-frequency range can be generated by walking in high heeled shoes, sounds from a metal, such as the use of a metal hammer, pets walking with toenails contacting the floor, such as a dog walking on the floor, and items dropped on the floor.

An HIIC rating of 63 or better is a high level of acoustical performance and generally considered a preferred level of HIIC. For hard surface flooring with any of the existing resilient matting products on the market, it is not generally possible to achieve HIIC ratings of 63 when installed on a 6 inch concrete slab structural system without a drop ceiling.

In some aspects, the system 10 can be configured to achieve a High-frequency Impact Insulation Class (HIIC) rating of at least 63, at least 65, at least 66, at least 67, or at least 68 from a lab test on a 6" concrete floor with no (drop) ceiling. In some aspects, the system 10 can be configured to achieve an Impact Insulation Class (IIC) rating of at least 56, at least 58, at least 59, at least 60, or at least 61 from a lab test on a 6" concrete floor with no (drop) ceiling. As can be understood by those skilled in the art, the above HIIC and IIC ratings can be well above commercially available acoustic underlayments, and particularly so for underlayments that are affordable to a typical residential consumer.

Disclosed is a method that can comprise installing the system 10 as disclosed herein. In various aspects, the system 10 can be installed on a subfloor surface 110. The subfloor surface 110 can comprise, for example, concrete, wood (e.g., plywood), or any other suitable subfloor material. Referring to FIG. 5, optionally, the base pad 20 can first be placed on the subfloor surface, and the floor panel 12 can subsequently be placed thereon. In some aspects, an adhesive can be deposited on the subfloor surface 110 or on the bottom surface of the base pad 20 prior to placing the base pad on the subfloor surface. In some examples, adhesive can be applied to only a portion of the base pad 20. For example, adhesive can be applied along or near perimeter of the base pad 20. In other aspects, the base pad 20 is not adhered to the subfloor and can instead be floating. In these aspects, an adhesive can optionally be deposited on the base pad 20 prior to placing the floor panel 12 thereon. In these aspects, an adhesive can optionally be deposited on the floor panel 12 prior to placing it on the base pad 20. In exemplary aspects, in embodiments in which the base pad 20 comprises a first layer 30 comprising a woven material layer and a second layer 32 comprising a nonwoven material layer, the base pad 20 can be oriented with the second layer facing the subfloor surface 110. In further aspects, and with reference to FIG. 6, the base pad 20 and floor panel 12 can be provided as a decorative unit 100 (FIG. 4) with the base pad coupled to the floor panel 12, and said unit 100 can be placed on the subfloor surface 110. In such aspects, the base pad 20 can have the same or substantially the same perimeter as that of the floor panel 12. For example, the base pad 20 and the floor panel 12 can have the same rectangular perimeter. In exemplary aspects, a pre-cut base pad 20 can be coupled to (e.g., adhered to) the floor panel 12. Optionally, the base pad 20 of the decorative unit 100 can comprise a first layer 30 and a second layer 32, wherein the first layer faces the floor panel 12, and said first layer can comprising nonwoven material, with the second layer 32 comprising woven material. It is contemplated that such an embodiment can be advantageous for double-stick applications so that the woven material engages the adhesive between the subfloor and the base pad. In still further aspects, the base pad 20 can comprise two woven materials with a non-woven material therebetween. For example, woven material can define top and bottom surfaces of the base pad 20 with a non-woven material therebetween. In this way, woven material can advantageously contact adhesive between both the base pad 20 and the floor panel 12 as well as between the base pad and the subfloor.

Figure 7:
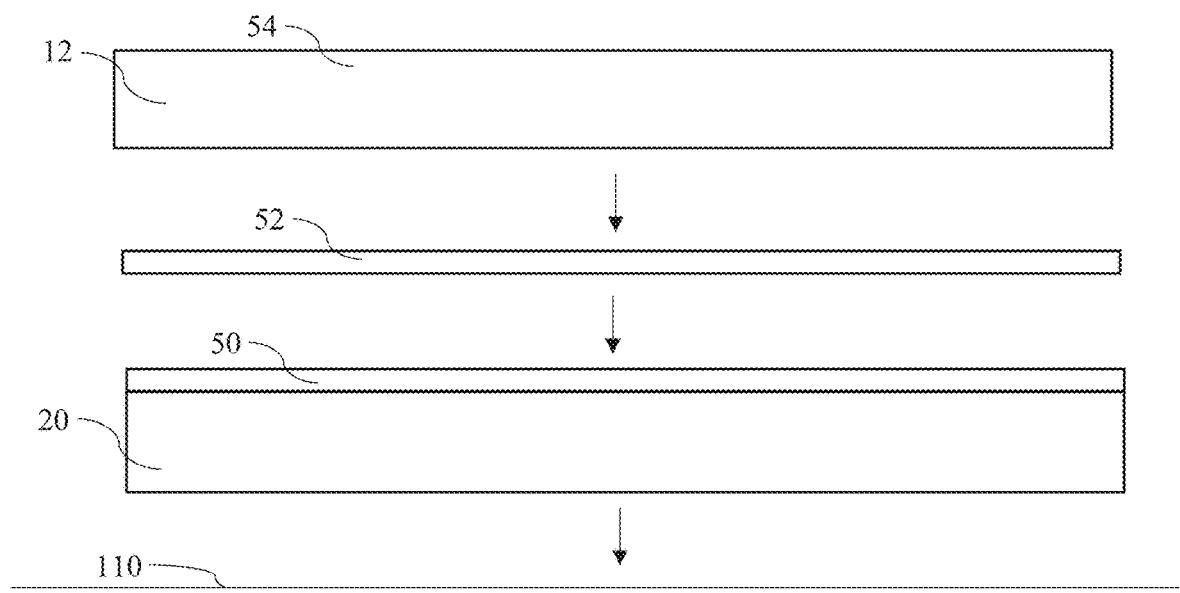
FIG. 7 illustrates an exemplary installation of the system comprising a leveling material on a subfloor.

Referring to FIG. 7, in further exemplary aspects, the base pad 20 can be placed on the subfloor surface 110. The barrier 50 can be coupled to the base pad 20 prior to placement of the base pad on the subfloor, or the barrier can subsequently be placed on the base pad 20. The self-leveling material 52 can be deposited on the barrier 50. The tile or other surfacing material 54 (shown in FIG. 3) can be positioned on top of the leveling material 52 (opposite the barrier 50). In other aspects, the barrier 50 can be coupled to the floor panel 12 prior to placing the flooring panel on the base pad 20. The self-leveling material 52 and tile or other surfacing material 54 can cooperate to form the floor panel 12.

In exemplary, optional aspects in which the base pad 20 comprises nonwoven material, the nonwoven material can comprise fibers having respective lengths from about 1 inch to 5 inches. The nonwoven material of the base pad 20 can optionally comprise low melt fibers or other binders. The nonwoven material of the base pad 20 can optionally comprise woven materials comprising polypropylene (PP), polyethylene terephthalate (PET) and/or other polymer. The base pad 20 can optionally comprise a spunbond material with fibers needled into the material. The base pad 20 can optionally comprise melt blown, wet laid, or spun laid fibers. The nonwoven fibers can comprise one or more materials, including, for example, PP, PET, polylactic acid (PLA), nylon 6, nylon 6-6, acrylics, cellulose or a combination thereof. Some or all of the fibers can be from post-industrial or post-consumer sources. Optionally, the fibers of the base pad 20 can be formed into nonwoven materials via carding and cross lapping, airlay, or Vlap technologies. The nonwoven formed by these processes can be needled, cured in via heat, sprayed with emulsion binders, powdered low melts, and adhesives to hold a shape or thickness. In some aspects, the density of the base pad 20 can optionally be from 6.25 lb/ft$^3$ (100 kg/m$^3$) to 37 lb/ft$^3$ (600 kg/m$^3$). In some aspects, the density of the base pad 20 can be from about 4.5 lb/ft$^3$ to about 30 lb/ft$^3$. The base pad can be provided under floor panel (e.g., hard surface flooring materials comprising polyvinylchloride (PVC), PET, polyethylene (PE), MgO and with thickness from about 2 mm to about 10 mm). In another aspect, the nonwoven material can be needled in a manner in which to form a fabric with a high percentage of the base material having fibers protruding from the needled surface (e.g., forming a fuzzy surface, or a velour dilour effect). In further aspects, the base pad 20 can comprise multiple layers having different fuzziness. For example, the second layer 32 can be fuzzier than the first layer 30. In further aspects, the second side 26 of the base pad 20 can be fuzzier than the first side 24.

In exemplary aspects, the base pad 20 can comprise non-woven or wet-laid fiberglass material (e.g., non-woven or wet-laid fiberglass scrims), as well as woven and non-woven thermoplastic materials (e.g. polypropylene, nylon and polyester). Optionally, in one exemplary aspect, the base pad 20 can comprise a fiberglass mat with an acrylic binder in a weight range from 0.7 to 2.5 ounces per square yard. In another optional aspect, it is contemplated that the base pad 20 can comprise a wet-laid fiberglass scrim with a SBR latex, PVOH, PVC latex, or PVC plastisol binder in a weight range of 0.4 to 2.5 ounces per square yard.

In exemplary aspects, the base pad 20 can comprise a non-woven material. Optionally, the base pad 20 can comprise a foam. The foam has air pockets, such as closed air pockets. The size and distribution of the air pockets can be controlled during manufacturing. For example, the size and distribution of the air pockets can be controlled by adding one or more fillers during the foaming process. Suitable fillers include, but are not limited to, coal fly ash, calcium carbonate, iron oxide, barium sulfate, silica, carbon black, graphite, talc, titanium dioxide, or any other filler known in the art.

Optionally, the base pad 20 can comprise a fleece material, such as for example and without limitation, a fleeced nonwoven material, whereby a polymeric non-woven textile is needle-punched with staple fibers to provide a fleeced polymeric non-woven material.

Optionally, the base pad 20 can comprise polypropylene, polyethylene terephthalate (PET), polyethylene, or combinations thereof. For example, when a polypropylene fleece is used as a base pad 20, it is contemplated that the base pad 20, or the non-woven material of the base pad, can be provided in an amount from 3 ounces/sq. yard to about 5 ounces/sq. yard or, in an amount of about 4 ounces/sq. yard. As another example, the base pad can comprise a PET or polypropylene needlebond pad, or combinations thereof, which can comprise virgin material, post-consumer material, post-industrial material, or combinations thereof, and which can optionally be provided in an amount ranging from about 4 ounces/sq. yard to about 30 ounces/sq. yard, or from about 12 ounces/sq. yard to about 20 ounces/sq. yard, or from about 14 ounces/sq. yard to about 18 ounces/sq. yard, or from about 12 ounces/sq. yard to about 15 ounces/sq. yard.

Optionally, in some aspects, the base pad 20 can be needle-punched. In these aspects, the base pad 20 can be heat-stabilized. Optionally, the base pad 20 can comprise a pointbond material.

In some aspects, the base pad 20 can comprise a woven needle punched polypropylene material such as SoftBac® manufactured by Shaw Industries, Inc. In this exemplary aspect, this material has been enhanced by having about 1.5 ounce/sq. yard of polypropylene fibers or polyethylene terephthalate fibers needle punched onto one side of it and has a total basis weight of about 3.5 ounce/sq. yard. This needle punched material can be laminated so as to have the polypropylene fibers embedded within an adhesive layer.

In some exemplary embodiments, disclosed herein is a system 10 comprising a base pad 20 having a thickness 22 from about 2 mm to about 4 mm, for example about 3 mm) and a floor panel 12 having a thickness of about 3 mm to about 5 mm, for example about 4 mm. The system 10 can comprise polyolefin. For example, the system 10 can comprise 100% polyolefin. In some aspects, the floor panel 12 can comprise polyvinylchloride. In some aspects, the base pad 20 can comprise PET. In exemplary aspects, the system 10 can comprise at least 70% recycled polymer, such as 80% of recycled polymer. The base pad 20 can optionally have a weight from about from about 14 ounces/sq. yard to about 18 ounces/sq. yard, such as for example about 17 ounces/sq. The system 10 can have an IIC rating of at least 57, such as an IIC rating of 59 according to ASTM E492-09/E989-06. The system 10 can have an HIIC rating of at least 67, such as an HIIC rating of 69, according to ASTM E222 of 69. The base pad 20 can be provided as a unit, provided in a roll, having an area of 1.82 meters by 18.29 meters, and be cut into suitable sized pieces depending on the size of the area to be installed. The base pad 20 can comprise a first layer 30 being a woven layer and a second layer 32 being a nonwoven layer. The base pad 20 is placed on a subfloor such that the second layer 32 connects to the subfloor, and an adhesive layer is applied to the first layer 30 being the woven layer. The floor panel 12 is applied onto the adhesive and at least one neighboring system 10 is connected via a tongue and groove connection.

As can be understood, conventionally, elevating hard surface flooring from a subfloor has been understood to be undesirable, as it results in floor unevenness and sagging. For example, a thick, soft padding can provide significant sound attenuation, but can lead to sagging or uneven flooring. Thin, hard padding typically provides substantially little sound attenuation. Advantageously, fiber (e.g., nonwoven) material with sufficiently high density as disclosed herein can achieve previously unattained sound insulating characteristics without the detriment of uneven or sagging flooring. Further, embodiments disclosed herein can be manufactured for a relatively low price as compared to other acoustic-improving elements, and particularly so as compared to the most effective alternative acoustic-improving elements. For example, foam rubber and crumb rubber can be prohibitively expensive for most commercial and residential applications. Embodiments disclosed herein can advantageously reduce acoustic transmission for lower frequencies such as those generated by dropped items, medium frequencies, such as those generated by walking, and higher frequencies, such as those from high heeled shoes and pet toenails. For example, referring to the table in FIG. 8, rows 8-14 illustrate acoustic properties of exemplary systems 10 as disclosed herein with comparisons to related underlayments shown in rows 1-7. As can be seen, the system 10 can provide superior acoustic properties over conventional underlayments. FIG. 9 shows acoustic properties of an exemplary system 10 as disclosed herein with comparisons to related underlayments and carpet. As can be seen, the disclosed exemplary system 10 can provide similar acoustic properties to carpet.

Referring to FIG. 10, in some exemplary aspects, the floor panel 12 can be a hard surface floor panel that comprises a substrate 70 and a decorative portion 60 (e.g., décor, wear and scratch layer, and/or any appropriate intermediate layers) coupled to the substrate 70. The decorative portion can comprise one or more layers including, but not limited to, an image layer, a wear layer, and/or a scratch layer. In some example aspects, there may be an additional layer such as a balancing layer (e.g., melamine impregnated paper, etc.) attached to the bottom surface of the substrate 70. As described above and shown at least in FIGS. 6 and 7, the base pad 20 may be integrally attached to the bottom surface of the floor panel 12, or the base pad 20 could be sold separately and configured to be attached to the floor panel 12.

Figure 6:
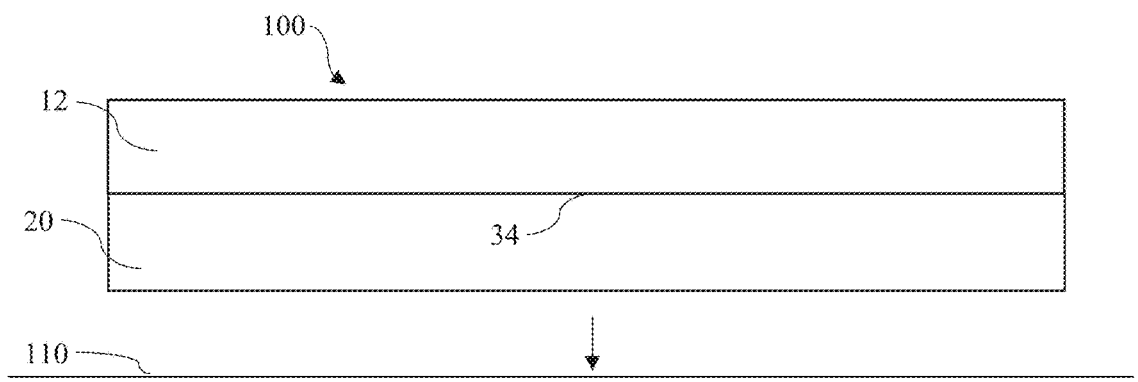
FIG. 6 illustrates an exemplary installation of the system on a subfloor.

As described in detail herein, and with further reference to FIGS. 1 and 6, the decorative unit 100 can comprise a floor panel 12 and base pad 20 coupled thereto. In some examples, the base pad 20 can be coupled to the floor panel on the second side 16 of the floor panel. In additional or alternative aspects, the decorative unit 100 can comprise a floor panel 12 with the base pad 20 embedded therein between the first side 14 and the opposing second side 16 of the floor panel 12. For example, in some aspects, the base pad 20 (e.g., comprising a nonwoven and, optionally, one or more woven layers) may be disposed between the decorative portion 60 and the substrate 70, see FIG. 10. For example, the base pad 20 may be disposed between the décor or image layer and the substrate 70. In some examples, the structure may be disposed in the substrate 70 as described below in greater detail. In still further aspects, the decorative unit 100 comprising a base pad 20 embedded therein (e.g., between the decorative portion 60 and substrate 70) can further comprise an additional base pad 20 below substrate 70. Optionally, the decorative unit 100 can comprise a first base pad embedded therein and a second base pad coupled to the lower surface of the substrate 70. In other aspects, the decorative unit 100 can comprise a first base pad embedded therein, and a second base pad can be positioned below, but not coupled to the substrate 70. In still other aspects, the decorative unit 100 can comprise a first base pad embedded therein, and a separate underlayment (e.g., a cork underlayment) can be positioned below the decorative unit.

The decorative portion 60 may also be interchangeably referred to as the top layer since said layer 60 may serve a decorative function as well as additional functions/purposes like providing scratch-resistance, moisture resistance, etc. The decorative portion 60 can serve to define the aesthetic look of the floor panel 12. In various aspects, the decorative portion can comprise a single layer or a plurality of layers. For example, the decorative portion 60 can comprise a decorative surface layer that defines at least one aesthetic characteristic (e.g., color, pattern, texture, glossiness, etc.), in addition to or instead of serving a structural, acoustic, etc., or other purpose. Optionally, the decorative portion 60 can comprise an image layer (e.g., a printed layer). In some examples, the décor layer may be printed directly on the substrate or on an ink receiving layer(s) disposed on the substrate 70. The decorative portion can further comprise one or more upper layers (e.g., a wear layer and/or a scratch layer) that may serve multiple purposes (texture, scratch resistance, gloss, etc.). Thus, in some optional aspects, each layer of the decorative portion 60 can impart at least one aesthetic characteristic of the floor panel. In some exemplary embodiments, the decorative portion 60 can be embodied in accordance with the decorative portion of the layered composite article described in U.S. Patent Application Publication No. 2018/0134016, published May 17, 2018, the entirety of which is hereby incorporated by reference herein.

The substrate 70 can include, but is not limited to, composite material such as, but not limited to, wood polymer composite, a wood plastic composite, a stone plastic composite, etc. The substrate can also include a mineral substrate such as a magnesium oxide substrate that is formed by a mixture of magnesium oxide, magnesium salts, and additives (e.g., wood fibers).

In some aspects, the substrate 70 can have a plurality of layers arranged in a layered structure. The layers can have different properties. In exemplary aspects, the substrate can have an arrangement of layers provided in an ABA structure. The 'A' layers and the 'B' layer(s) can impart different characteristics to the substrate. In some aspects, the 'B' layer(s) can include, but is not limited to, a foamed material, a nonwoven material, etc. 'A' layers can include, but is not limited to, composite materials, engineered hardwood materials, etc. In some examples, 'B' layer(s) can comprise a breathable material. In other examples, 'B' layer(s) can be both breathable and dimensionally stable. It is noted that 'B' layer(s) can be structured as a pad that is rigid or flexible. Further, 'B' can be structured to fit as a layer in between the 'A' layers. In some examples, additives such as fiberglass, fibers (wood or hemp fibers), etc., can add/provide dimensional stability to the 'A' layer(s) or the 'B' layer(s). Composite materials that can be used in the 'A' layer(s) can include, but are not limited to, wood polymer or wood plastic composite, stone polymer or stone plastic composite, mineral composite (magnesium oxide composite, etc.), LVT, LVP, etc. In one example, the foamed material can include an irradiated cross-linked polyethylene (IXPE) pad. In one example, the nonwoven material can include a pad made of fibers that are needled together or twisted together (not extruded or foamed). The base pad 20 can be structured as a panel, board, tile, etc., that is rigid and dimensionally stable. In one example, the nonwoven material can be a nonwoven panel as described in any one of U.S. Patent Applications Publication Nos. 2018/0134016, published May 17, 2018; 2021/0370654, published Dec. 2, 2021; or 2022/0161519, published May 26, 2022, each of which is incorporated herein by reference in its respective entirety. In another example, 'B' layer(s) can be embodied as the base pad 20 described herein. The ABA structure can be arranged such that the density of layer 'B' is lower than the density of the 'A' layers. In other examples, the density of layer(s) 'B' can be higher than the density of the 'A' layers. In some examples, one layer A may be different in construction, composition, density, and/or structure from the other layer A in the ABA structure.

In various exemplary embodiments, layer(s) 'B' can include a single layer or multiple layers. For example, layer 'B' can include layers B1, B2, etc. Each of the multiple layers (B1, B2, . . . etc.) can be breathable layers. Each of the multiple layers (B1, B2, . . . etc.) can be different from each other in construction, structure, and/or composition. The multiple layers (B1, B2, . . . etc.) can have the same or differing densities. For example, layer B can have 3 sub layers B1-B3 arranged such that B2 is sandwiched between B1 and B3 and layer B2 can have a higher density than B1 and B3. In alternative aspects, B2 can have a lower density than B1 and B3. Alternatively, the density of the sublayers can increase or decrease (e.g., changing gradually) from top to bottom (i.e., from B1 to B3). In one example, the multiple layers (B1, B2, . . . etc.) can be nonwovens. Alternatively, the multiple layers can be a combination of woven and non-woven without departing from a broader scope of the present disclosure. For example, B1 may be a woven and B2 may be a non-woven as described above with respect to the base pad 20.

In some other aspects, the substrate may have other structures and is not limited to the ABA structure. For example, the substrate can be ABABA structure. In these aspects, the B layers can be breathable material and can also be dimensionally stable. The thickness of the substrate can range from 2 mm to 12 mm (both end values included) without departing from a broader scope of the disclosure. Like layer 'B', as described above, in some examples, layer A may can include multiple other layers (sub layers, e.g., A1, A2, etc.) that may be similar or different from each other in construction, structure, density and/or composition. The substrate structures described above can further improve in-room and below room acoustics of the floor panel 12 (i.e., in addition to or in lieu of using the base pad 20 at the bottom of the floor panel 12).

In still further aspects, an article can comprise a base pad 10 with an image layer printed thereon, or otherwise coupled to, the upper surface of the base pad. Said article can further comprise a wear layer and a scratch layer above the wear layer. Optionally, in these aspects, the substrate 70 can be omitted from the article.

In addition to improved acoustic properties, the disclosed systems, methods, and flooring elements can provide improved comfort, minimized indentation and sagging, ease of installation, and various other factors that will be apparent to those skilled in the art.

Figure 11:
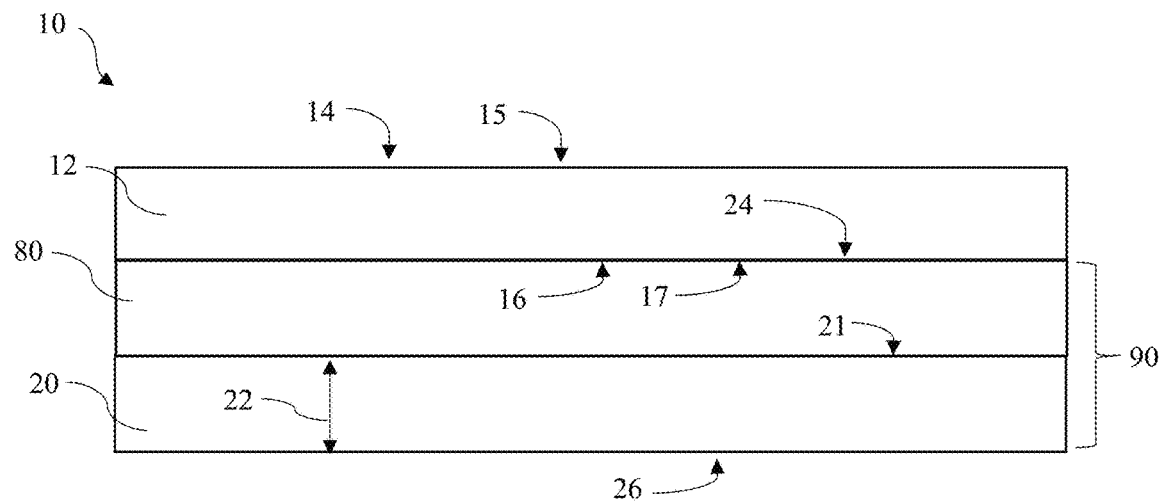
FIG. 11 is a schematic diagram of a diagram of a system comprising a decorative element, an acoustic article, and a stiffening structure between the decorative element and the acoustic article, as disclosed herein.

System Having a Stiffening Structure Between Decorative Element and Acoustic Article Referring to FIG. 11, also disclosed herein is a system 10 comprising a decorative element 12 having a first side 14 and an opposing second side 16. The decorative element 12 has a first surface 15 on the first side 14 and a second surface 17 on the opposing second side 16. An acoustic article 20 is disposed on the opposing second side 16 of the decorative element 12. The acoustic article 20 has a thickness 22 between a first side 24 and an opposed second side 26. The acoustic article 20 comprises a resiliently compressible material. The acoustic article 20 has a thickness of at least 0.4 mm. The acoustic article 20 is compressible by less than 25% of the thickness when subjected to a pressure of 2 lbf/in$^2$. A stiffening structure 80 is disposed between the decorative element 12 and the acoustic article 20.

Accordingly, in some aspects, the stiffening structure 80 can be positioned between the decorative element (floor panel) and the acoustic article (base pad). The stiffening structure 80 positioned between the decorative element and the acoustic article can provide various advantages further disclosed herein.

The stiffening structure 80 can provide an increased stiffness to the acoustic article 20 in comparison to an acoustic article with the stiffening structure omitted. In some aspects, the stiffness of can be characterized in accordance with ASTM D1388-18.

In some aspects, the stiffening structure 80 and the acoustic article 20 can cooperate to provide a stiffness of at least 40,000 microjoules/meter (in accordance with the testing procedure of ASTM D1388-18). That is, an assembly of the stiffening structure 80 coupled to the acoustic article 20, when tested in accordance with the testing procedure of ASTM D1388-18, can provide a measurement of at least 40,000 microjoules/meter. Even though the acoustic article 20 and the stiffening structure 80 may not necessarily be provided in isolation, it should be understood that the material properties of the acoustic article 20 and the stiffening structure 80 can be such that the measurement would be achieved had the acoustic article 20 and the stiffening structure 80 been provided in isolation. It is contemplated that the measurement according to ASTM D1388-18 can vary based on the orientation of the material (e.g., with the stiffening structure above or below the acoustic article). In these aspects, the measurement according to ASTM D1388-18 can be the orientation of the material in a use condition. In some aspects, the stiffening structure 80 and the acoustic article 20 can cooperate to provide a stiffness of at least 50,000 microjoules/meter. In some aspects, the stiffening structure 80 and the acoustic article 20 can cooperate to provide a stiffness of at least 60,000 microjoules/meter. In some aspects, the stiffening structure 80 and the acoustic article 20 can cooperate to provide a stiffness of at least 70,000 microjoules/meter. In some aspects, the stiffening structure 80 and the acoustic article 20 can cooperate to provide a stiffness of at least 80,000 microjoules/meter. In some aspects, the stiffening structure 80 and the acoustic article 20 can cooperate to provide a stiffness of at least 90,000 microjoules/meter. In some aspects, the stiffening structure 80 and the acoustic article 20 can cooperate to provide a stiffness of at least 100,000 microjoules/meter. In some aspects, the stiffening structure 80 and the acoustic article 20 can cooperate to provide a stiffness of at least 110,000 microjoules/meter. In some aspects, the stiffening structure 80 and the acoustic article 20 can cooperate to provide a stiffness of at least 120,000 microjoules/meter. In some aspects, the stiffening structure 80 and the acoustic article 20 can cooperate to provide a stiffness of at least 130,000 microjoules/meter. In some aspects, the stiffening structure 80 and the acoustic article 20 can cooperate to provide a stiffness of at least 140,000 microjoules/meter. In some aspects, the stiffening structure 80 and the acoustic article 20 can cooperate to provide a stiffness of at least 150,000 microjoules/meter. In some aspects, the stiffening structure 80 and the acoustic article 20 can cooperate to provide a stiffness of at least 160,000 microjoules/meter. In some aspects, the stiffening structure 80 and the acoustic article 20 can cooperate to provide a stiffness of no more than 500,000 microjoules/meter. In other aspects, the stiffening structure 80 and the acoustic article 20 can cooperate to provide a stiffness that exceeds 500,000 microjoules/meter. In some aspects, the stiffening structure 80 and the acoustic article 20 can cooperate to provide a stiffness from about 40,000 microjoules/meter to about 500,000 microjoules/meter. In some aspects, the stiffening structure 80 and the acoustic article 20 can cooperate to provide a stiffness from about 50,000 microjoules/meter to about 200,000 microjoules/meter.

In some aspects, the stiffness of the acoustic article with stiffening structure can be greater than the stiffness of the acoustic article without the stiffening structure. For example, the stiffness of the acoustic article with stiffening structure can be greater than or equal to 2 times the stiffness of the acoustic article without the stiffening structure. That is, an assembly of the stiffening structure 80 coupled to the acoustic article 20, when tested in accordance with the testing procedure of ASTM D1388-18, can provide a measurement that is at least 2 times the stiffness of the acoustic article without the stiffening structure when using the same testing procedure. Even though the acoustic article 20 and the stiffening structure 80 may not necessarily be provided in isolation, it should be understood that the material properties of the acoustic article 20 and the stiffening structure 80 can be such that these measurements, providing the 2:1 stiffness ratio, would be achieved had the acoustic article 20 and the stiffening structure 80 been provided in isolation. In some aspects, the stiffness of the acoustic article with stiffening structure may be greater than or equal to 3 times the stiffness of the acoustic article without the stiffening structure. In some aspects, the stiffness of the acoustic article with stiffening structure may be greater than or equal to 4 times the stiffness of the acoustic article without the stiffening structure. In some aspects, the stiffness of the acoustic article with stiffening structure may be greater than or equal to 5 times the stiffness of the acoustic article without the stiffening structure. In some aspects, the stiffness of the acoustic article with stiffening structure may be greater than or equal to 6 times the stiffness of the acoustic article without the stiffening structure. In some aspects, the stiffness of the acoustic article with stiffening structure may be greater than or equal to 7 times the stiffness of the acoustic article without the stiffening structure. In some aspects, the stiffness of the acoustic article with stiffening structure may be greater than or equal to 8 times the stiffness of the acoustic article without the stiffening structure. In some aspects, the stiffness of the acoustic article with stiffening structure may be greater than or equal to 9 times the stiffness of the acoustic article without the stiffening structure. In some aspects, the stiffness of the acoustic article with stiffening structure may be greater than or equal to 10 times the stiffness of the acoustic article without the stiffening structure. In some aspects, the stiffness of the acoustic article with stiffening structure may be greater than or equal to 11 times the stiffness of the acoustic article without the stiffening structure. In some aspects, the stiffness of the acoustic article with stiffening structure may be greater than or equal to 12 times the stiffness of the acoustic article without the stiffening structure. In some aspects, the stiffness of the acoustic article with stiffening structure may be greater than or equal to 13 times the stiffness of the acoustic article without the stiffening structure.

In some aspects, the ratio of a density of stiffening structure to a density of the acoustic article (D_stiffening_structure top/D_acoustic_pad) can be greater than 1. In some examples, the stiffening structure can be at least 1.1 times, at least 1.2 times, at least 1.3, at least 1.5 times, at least 2 times, at least 3 times, at least 5 times, at least 10 times, or at least 30 times that of the density of the acoustic article. In some examples, the density of the stiffening structure can be the same as, or substantially the same as, the density of the acoustic article.

In some aspects, the stiffening layer can have a thickness of less than ⅓ of a combined thickness of the stiffening layer and the acoustic article. In some aspects, the stiffening layer can have a thickness of less than ½ of the combined thickness of the stiffening layer and the acoustic article. In some aspects, the stiffening layer and the acoustic article can have a combined thickness from about 0.4 to about 25 mm.

In some aspects, the acoustic article 20 can be the resiliently compressible material. Thus, in some aspects, the resiliently compressible material can have a thickness of at least 0.4 mm and can compress by less than 25% of the thickness when subjected to a pressure of 2 $lbf/in^2$.

Figure 12:
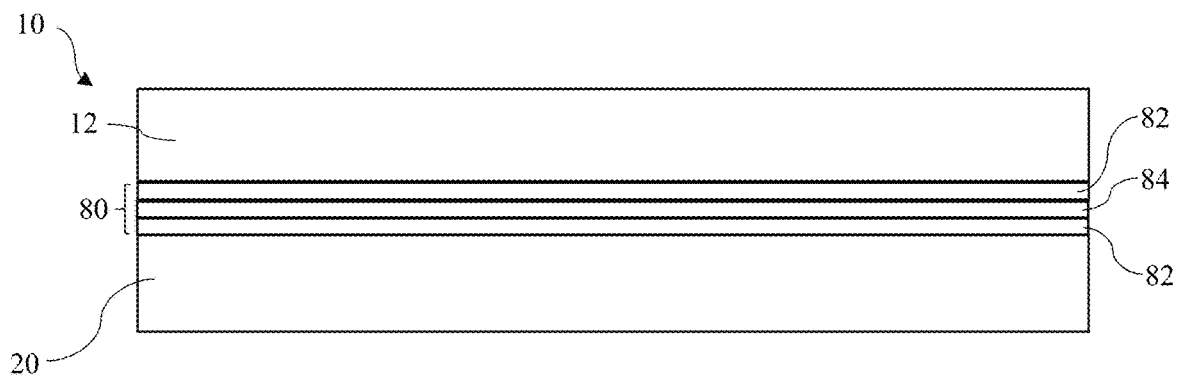
FIG. 12 is a schematic diagram of the system of FIG. 11, wherein the stiffening structure comprises a plurality of layers.

In some aspects, the stiffening structure 80 consists of a single layer. For example, in some aspects, the stiffening structure 80 can consist of a single thermoplastic layer. In other aspects, and with further reference to FIG. 12, the stiffening structure 80 can comprise a plurality of layers. For example, the plurality of layers can be laminated together. In some aspects, the plurality of layers can comprise a layer of thermoplastic 82 and a structural stabilizer 84. In some optional aspects, the plurality of layers can comprise two thermoplastic layers 82. For example, the plurality of layers can comprise a structural stabilizer 84 laminated between the two thermoplastic layers 82. In exemplary aspects, the thermoplastic can be vinyl, rubber, polyolefin, polyester, or a combination thereof. In some aspects, the thermoplastic layer(s) can be provided as a polymer film. In various aspects, the structural stabilizer can comprise fiberglass, woven fabric, non-woven fabric, or a combination thereof. In some example aspects, the stiffening structure 80 can vary from 100% fiber to a mix of fiber and rubber at any ratio.

In some aspects, the stiffening structure can comprise a rigid fabric. Such a rigid fabric can be, for example, a structured non-woven. The structured non-woven can comprise a highly singed low melt fiber. Optionally, the stiffening structure 20 can consist of a rigid fabric.

In some aspects, the stiffening structure 80 can comprise one or more polymer films. Optionally, said polymer can be rubber. In some aspects, the stiffening structure 80 can comprise PET Hybrid (a composite article as described in U.S. Pat. No. 11,603,611, issued Mar. 14, 2023, which is incorporated herein by reference). In some aspects, the stiffening structure 80 can comprise a nonwoven panel as described in any one of U.S. Patent Applications Publication Nos. 2018/0134016, published May 17, 2018; 2021/0370654, published Dec. 2, 2021; or 2022/0161519, published May 26, 2022, each of which is incorporated herein by reference in its respective entirety. In some aspects, the stiffening structure 80 can comprise vinyl.

In some aspects, the stiffening structure 80 can be coupled to the acoustic article 20. For example, in some optional aspects, the stiffening structure 80 can be adhesively coupled to the acoustic article 20. In other aspects, the stiffening structure 80 can be bonded (e.g., thermally bonded) to the acoustic article 20.

In some aspects, the decorative element 12 can be coupled to the stiffening structure 80. For example, the decorative element 12 can be adhesively coupled to the stiffening structure 80. In other aspects, the decorative element 12 is not coupled to the stiffening structure 80. For example, the decorative element 12 can be said to be "floating."

In some aspects, the stiffening structure 80 comprises a first plurality of fibers having a first melting point, and the acoustic article 20 can comprise a second plurality of fibers having a second melting point that is higher than the first melting point. At least a portion of the first plurality of fibers can melted to form the stiffening structure. In some aspects, all, or substantially all of the first plurality of fibers can be melted to form the stiffening structure. Accordingly, in some aspects, the stiffening structure 80 and the acoustic article 20 can be integrally formed together. Optionally, the first and second plurality of fibers can be entangled together prior to melting the at least a portion of the first plurality of fibers to form the stiffening structure. Accordingly, an intermediate structure can comprise a plurality of the acoustic article and a first plurality of fibers, wherein the first plurality of fibers are positioned against or entangled with the acoustic article. Upon melting a portion of or all of the first plurality of fibers, the melted fibers can form the stiffening structure that is coupled to the acoustic article 20 by integral formation. In some embodiments, in which the stiffening structure 80 is integrally attached to the acoustic article 20, such a stiffening structure can be formed by placing the stiffening structure 80 on the acoustic article 20 and by melting a portion of or all of the first plurality of fibers to adhere to the stiffening structure 80. In other aspects, the stiffening structure 80 can be first formed separately from the acoustic article and then attached to the acoustic article 20. For example, first plurality of fibers can be melted to form the stiffening structure 80, and said stiffening structure can subsequently be coupled to the acoustic article 20.

In some aspects, the resiliently compressible material of the acoustic article comprises an entangled fiber structure. For example, the entangled fiber structure can comprise, or can be, a needle bonded fabric. In other aspects, the entangled fiber structure can comprise, or can be, any other entangled fiber structure disclosed herein. For example, the entangled fiber structure can comprise nonwoven material. The nonwoven material can comprise as sheet or web structure bonded together by entangling fiber or filaments (and by perforating films) mechanically, thermally or chemically. For example, the nonwoven material can comprise needlebond or spun bond material. In some aspects, the nonwoven material can comprise polyethylene, polypropylene, polyester, nylon, polystyrene, polylactic acid, or a combination thereof. In some aspects, the nonwoven material can comprise, or consist of, or consist essentially of recycled polymer (post-industrial, post-consumer, etc.). In other aspects, the nonwoven material can comprise virgin polymer.

Figure 2:
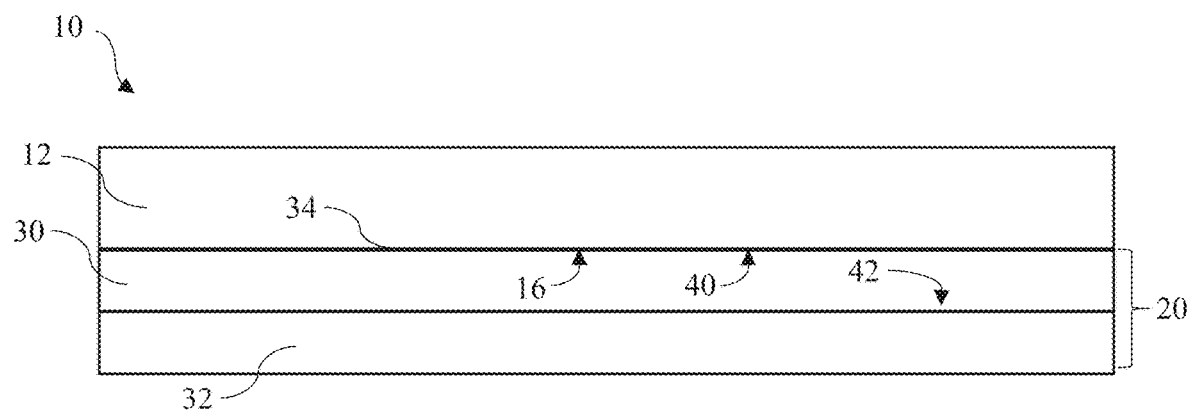
FIG. 2 is a schematic diagram of a system comprising an acoustic article having a plurality of layers.

In some aspects, the acoustic article can have only one single layer. Referring also to FIG. 2, in some aspects, the acoustic article 20 can comprise a plurality of layers. For example, in some optional aspects, the acoustic article 20 can comprise at least one layer comprising nonwoven material and at least one layer comprising woven material. For example, a first layer 30 can be a woven material and a second layer 32 can be a non-woven material. In some aspects, the first layer 30 comprising woven material can be positioned facing to the second surface 17 of the floor panel 12. Still further, the first layer 30 comprising woven material can provide rigidity to the acoustic article. For example, the woven material can inhibit elongation in one or both of warp and weft directions. In further aspects, the first and second layers 30, 32 can both comprise nonwoven materials. In further aspects, the first and second layers 30, 32 can both comprise woven materials. In some example embodiments, the first layer 30 can comprise a non-woven material and the second layer 32 can comprise a woven material.

More generally, the acoustic article can be embodied as described in other sections of this present disclosure.

In some aspects, the resiliently compressible material of the acoustic article can comprise a non-woven material. In some aspects, the resiliently compressible material of the acoustic article can comprise foam, rubber, or composite. In other aspects, the resiliently compressible material of the acoustic article can comprise cork. In various aspects, the resiliently compressible material of the acoustic article can be a sound-absorbing material. In these aspects, optionally, the sound-absorbing material can include, but not be limited to, foam, rubber, composite, non-woven fabric, or cork. The foam can be a closed-cell foam or an open-cell foam. The foam can be a polymer based foam, such as a polyurethane foam, polyethylene-vinyl acetate foam, polyethylene foam, polypropylene foam, polystyrene foam, silicone foam, or polyvinyl chloride foam. Composites can include, but not be limited to, a resilient polymer with a reinforcement material dispersed therethrough. Such a reinforcement material can include, for example, fiberglass, carbon fiber, carbon nanotubes.

In some aspects, the acoustic article and the stiffening structure can be coupled together and provided as a unitary component. The unitary component can serve as a subsurface article over which a decorative element can be placed.

Disclosed herein, in one aspect, is a subsurface article 90 comprising an acoustic article 20 comprising a resiliently compressible material. The acoustic article 20 has a thickness of at least 0.4 mm and is compressible by less than 25% of the thickness when subjected to a pressure of 2 lbf/in². The acoustic article 20 has a first side 21. The subsurface article 90 further comprises a stiffening structure 80 positioned on the first side 21 of the acoustic article 20.

Disclosed herein is a method of installing the system onto a subfloor surface. In some aspects, the method can comprise placing an assembly comprising the decorative element coupled to the acoustic article, with the stiffening structure disposed between the decorative element and the acoustic article, on the subfloor surface. That is, the decorative element, the stiffening structure, and the acoustic article can be coupled together and installed together. In some examples, the unit comprising the decorative element, stiffening structure, and the acoustic article may be installed as a floating floor. In other aspects, the unit comprising the decorative element, stiffening structure, and the acoustic article may be installed as a floating floor may be installed using glue down installation (e.g., glue disposed on subfloor and the unit comprising the decorative element, stiffening structure, and the acoustic article is glued down to the subfloor such that glue or adhesive is disposed between a surface of the acoustic article facing the subfloor and the subfloor). In some examples, the bottom surface of the acoustic article (i.e., surface that will face the subfloor upon installation) can be made sticky (e.g., backed with an adhesive) and can be provided with a release paper. The release paper may be removed, and the acoustic article can be stuck to the subfloor.

In alternative aspects, the acoustic article and the stiffening structure can be installed on the subfloor surface, and the decorative element can then be placed or installed on the stiffening structure either using a glue down installation or as a floating floor installation. In some example aspects, the acoustic article and stiffening structure may be designed for loose lay installation.

As described above, in some aspects, an adhesive can be deposited between the stiffening structure and the decorative element for a glue down installation.

Figure 4:
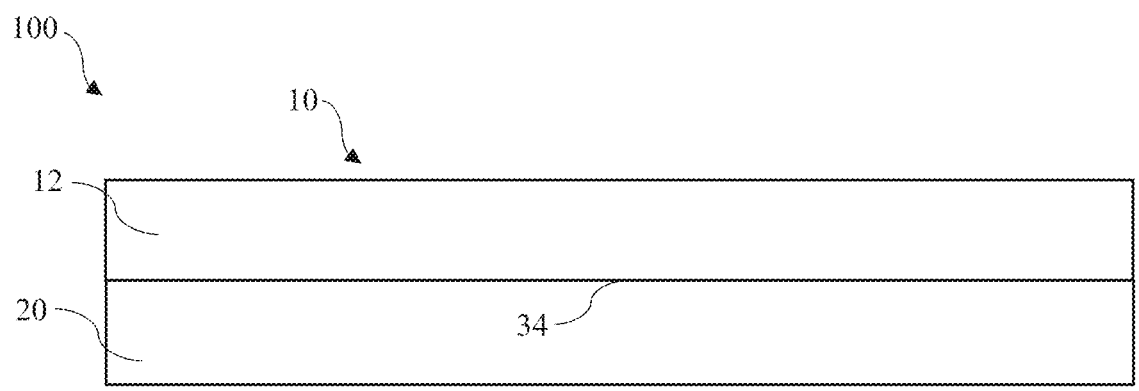
FIG. 4 is a schematic diagram of a decorative unit comprising a decorative element and an acoustic article as disclosed herein.
Figure 5:
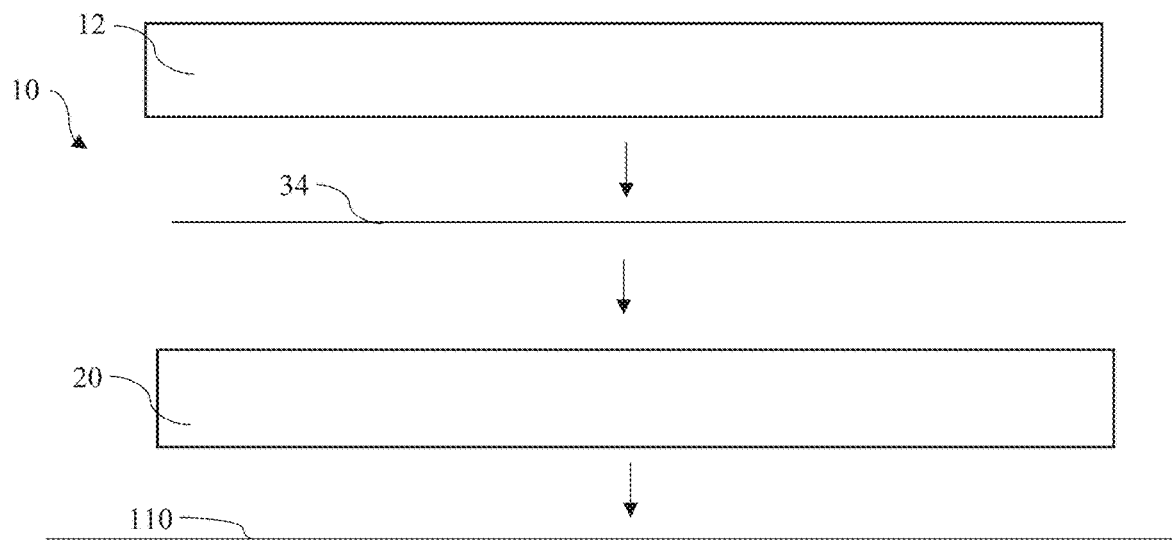
FIG. 5 illustrates an exemplary installation of the system on a subfloor.

Referring to FIGS. 4 and 11, it is further contemplated that the decorative unit 100, as disclosed herein, can incorporate a stiffening structure 80 between the decorative element 12 and the acoustic article 20. The decorative unit 100 can be installed to form a surface covering, such as a floor covering, or a wall or ceiling covering.

Accordingly, disclosed herein, in one aspect, is a decorative unit 100 comprising a decorative element 12 having a first side 14 and an opposing second side 16, wherein the decorative element has a first surface 15 on the first side 14 and a second surface 17 on the opposing second side 16. An acoustic article 20 is coupled to the decorative element 12 on the opposing second side of the decorative element. The acoustic article comprises a resiliently compressible material, has a thickness of at least 0.4 mm, and is compressible by less than 25% of the thickness when subject to a pressure of 2 lbf/in². A stiffening structure 80 is disposed between the decorative element and the acoustic article.

Including the stiffening structure 80 in the system 10 can provide various advantages. As one advantage, the stiffening structure 80 can distribute load on the decorative element 12 across the acoustic article 20 to prevent deflection of the decorative element 12 when load is applied thereto. For example, luxury vinyl tile (LVT) is an example of a flexible resilient decorative element that can deflect when load is applied thereto. In certain situations and configurations, absent a stiffening structure underneath to support the LVT, the LVT can deflect to an extent that the deflection leads to uneven flooring, interfere with couplings of adjacent LVT, or otherwise cause damage to the LVT. Further, the resiliently compressible material of the acoustic article can permit airflow therethrough. For example, the resiliently compressible material can comprise entangled fiber or open cell foam that permits airflow therethrough. In some situations, moisture permeability can be desirable. However, in other situations, moisture permeability can be undesirable. If moisture is present below the acoustic article, the stiffening structure can provide an impermeable barrier that prevents moisture from reaching the decorative element. Instead, the moisture can dissipate laterally. In this way, for example, condensate on concrete surfaces can be inhibited. Still further, the stiffening structure 80 can receive adhesive for coupling the decorative element thereto. Inclusion of the stiffening structure 80 can prevent adhesive from penetrating the resiliently compressible material, which can inhibit its compressibility as well as air permeability.

In some aspects, the system 10 comprising the stiffening structure 80 can be configured to achieve a High-frequency Impact Insulation Class (HIIC) rating of at least 63, from a lab test on a 6" concrete floor with no (drop) ceiling when tested with a 2 mm Luxury Vinyl Tile or Plank installed above the system 10 with the stiffening structure 80. In further aspects, the system 10 comprising the stiffening structure 80 can be configured to achieve a High-frequency Impact Insulation Class (HIIC) rating at least 64, from a lab test on a 6" concrete floor with no (drop) ceiling when tested with a 2 mm Luxury Vinyl Tile or Plank installed above the system 10 with the stiffening structure 80. In some aspects, the system 10 with the stiffening structure 80 can be configured to achieve an Impact Insulation Class (IIC) rating of at least 57 from a lab test on a 6" concrete floor with no (drop) ceiling when tested with a 2 mm Luxury Vinyl Tile or Plank installed above the system 10 with the stiffening structure 80. In further aspects, the system 10 with the stiffening structure 80 can be configured to achieve an Impact Insulation Class (IIC) rating of at least 58 from a lab test on a 6" concrete floor with no (drop) ceiling when tested with a 2 mm Luxury Vinyl Tile or Plank installed above the system 10 with the stiffening structure 80. As can be understood by those skilled in the art, the above HIIC and IIC ratings can be well above commercially available acoustic underlayments, and particularly so for underlayments that are affordable to a typical residential consumer. In some aspects, the system 10 with the stiffening structure 80 can be configured to achieve an Impact Insulation Class (IIC) rating of at least 56 from a lab test on a 6" concrete floor with no (drop) ceiling when tested with a 2 mm Luxury Vinyl Tile or Plank installed above the system 10 with the stiffening structure 80. As can be understood by those skilled in the art, the above HIIC and IIC ratings can be well above commercially available acoustic underlayments, and particularly so for underlayments that are affordable to a typical residential consumer.

ASTM D1388-18 Simplified Description

Figure 13:
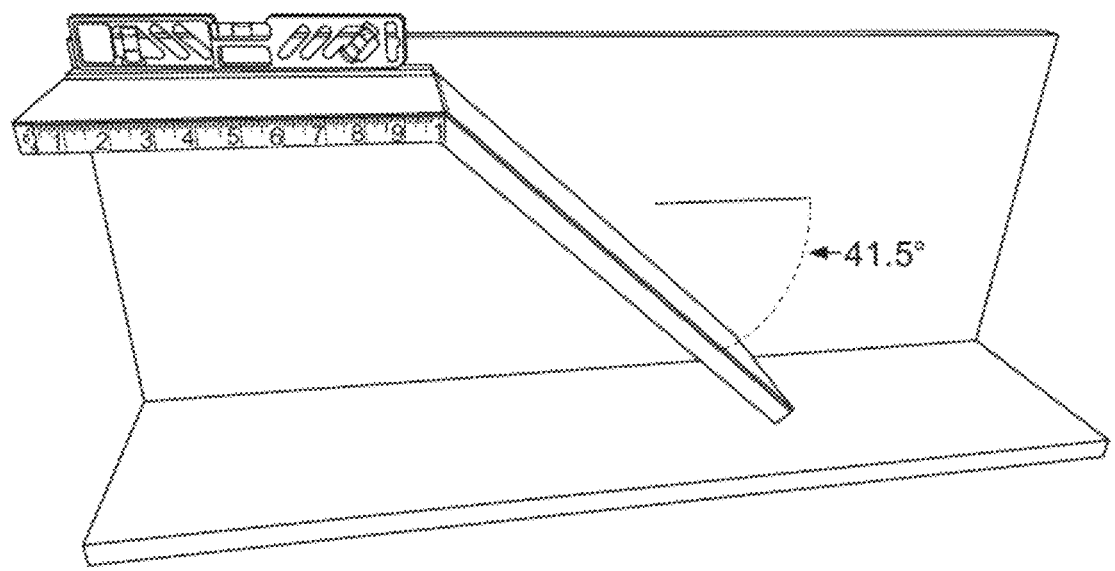
FIG. 13 shows a perspective view of an exemplary test apparatus for performing the test method ASTM D1388-18.
Figure 14:
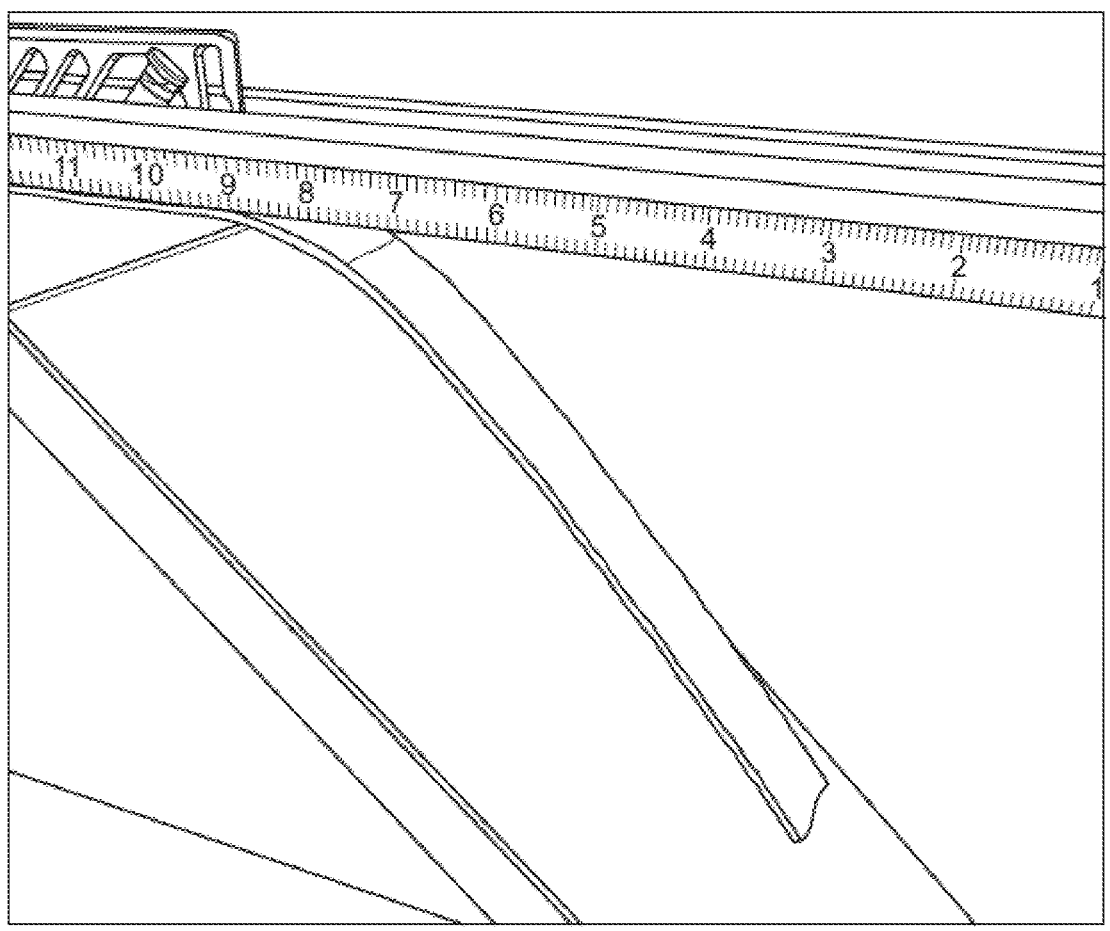
FIG. 14 is a perspective view of a material being tested on the test apparatus of FIG. 13.

Referring to FIGS. 13-14, the material (e.g., acoustic article) or assembly (e.g., acoustic article and stiffening structure 80 attached thereto) is pushed over the edge of a table. The measurement corresponds to the distance that the material or assembly extends from the edge at which point the end falls to a specified angle (41.5 degrees). The stiffer the material/assembly, the longer the distance.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspects labeled "A," "B," and "C" are provided as disclosure using alternative terminology and do not indicate differentiated scope based on the different terminology.

Aspect 1A: A system comprising:
a decorative element having a first side and an opposing second side; and
an acoustic article configured to be disposed on the opposing second side of the decorative element, wherein the acoustic article:
comprises an entangled fiber structure;
has a thickness of at least 0.4 mm; and
is compressible by less than 25% of the thickness when subjected to a pressure of 2 lbf/in$^2$.

Aspect 2A: The system of aspect 1A, wherein the decorative element comprises polymer.

Aspect 3A: The system of aspect 1A, wherein the decorative element comprises wood.

Aspect 4A: The system of aspect 1A, wherein the decorative element comprises cementitious panel subfloor.

Aspect 5A: The system of any one of aspects 2A-4A, wherein the decorative element is flexible and resilient.

Aspect 6A: The system of any one of the preceding aspects, wherein the acoustic article has no filler dispersed therethrough.

Aspect 7A: The system of aspect 6A, wherein the acoustic article consists essentially of nonwoven material and air dispersed therethrough.

Aspect 8A: The system of any one of the preceding aspects, wherein the acoustic article comprises a plurality of fibers having a denier above 12.

Aspect 9A: The system of aspect 8A, wherein the denier is about 15.

Aspect 10A: The system of any one of the preceding aspects, wherein the acoustic article has a thickness from 0.4 mm to 25 mm.

Aspect 11A: The system of any one of the preceding aspects, wherein the acoustic article comprises a first plurality of fibers having a first melting point and a second plurality of fibers having a second melting point that is greater than the melting point of the first plurality of fibers.

Aspect 12A: The system of any one of the preceding aspects, wherein the acoustic article comprises a plurality of layers.

Aspect 13A: The system of aspect 12A, wherein the plurality of layers have different respective densities.

Aspect 14A: The system of any one of the preceding aspects, wherein the acoustic article comprises polyethylene, polypropylene, polyester, nylon, or a combination thereof.

Aspect 15A: The system of any one of the preceding aspects, wherein the acoustic article comprises a first layer and a second layer that is coupled to the first layer, wherein the first layer is disposed between the decorative element and the second layer.

Aspect 16A: The system of aspect 15A, wherein the first layer comprises a woven material, wherein the second layer comprises a nonwoven material, wherein the nonwoven material and woven material are integrally formed as a composite material.

Aspect 17A: The system of aspect 15A or aspect 16A, further comprising an adhesive disposed between the first layer and the decorative element.

Aspect 18A: The system of any one of the preceding aspects, further comprising a barrier between the acoustic article and the decorative element, wherein the barrier is liquid impermeable and/or breathable.

Aspect 19A: The system of aspect 18A, further comprising a leveling material disposed between the barrier and the decorative element.

Aspect 20A: The system of any one of the preceding aspects, wherein the system is configured to achieve a High-frequency Impact Insulation Class (HIIC) rating of at least 65 in a lab test on a 6" concrete floor with no ceiling.

Aspect 21A: The system of aspect 20A, wherein the system is configured to achieve an HIIC rating of at least 68.

Aspect 22A: The system of any one of the preceding aspects, wherein the system is configured to achieve an Impact Insulation Class (IIC) rating of at least 58 in a lab test on a 6" concrete floor with no ceiling.

Aspect 23A: The system of any one of the preceding aspects, wherein the acoustic article has a density of at least 4.5 pounds per cubic foot.

Aspect 24A: The system of any one of the preceding aspects, wherein the acoustic article is compressible by 25% of the thickness when subject to a pressure from 2.1 lbf/in$^2$ to 20 lbf/in$^2$.

Aspect 25A: The system of any one of the preceding aspects, wherein the acoustic article is compressible by less than 15% when subject to a pressure of 2 lbf/in$^2$.

Aspect 26A: The system of any one of the preceding aspects, wherein the acoustic article is compressible by between 10% and 25% of the thickness when subject to a pressure of 2 lbf/in$^2$.

Aspect 27A: The system of aspect 1, wherein the acoustic article is disposed on the opposing second side of the decorative element.

Aspect 28A: A method of installing the system as in any one of the preceding aspects.

Aspect 29A: The method of aspect 28A, wherein the method comprises placing an assembly comprising the decorative element coupled to the acoustic article on a subfloor surface.

Aspect 30A: The method of aspect 28A, wherein the method comprises:
placing the acoustic article on a subfloor surface; and
placing the decorative element on the acoustic article.

Aspect 31A: The method of aspect 30A, further comprising depositing an adhesive between the acoustic article and the decorative element.

Aspect 32A: A decorative unit comprising:
a decorative element having a first side and an opposing second side;

an acoustic article coupled to the decorative element on the opposing second side of the decorative element, wherein the acoustic article:
comprises an entangled fiber structure;
has a thickness of at least 0.4 mm; and
is compressible by less than 25% of the thickness when subject to a pressure of 2 lbf/in$^2$.

Aspect 33A: The decorative unit of aspect 32A, wherein the decorative element comprises polymer.

Aspect 34A: The decorative unit of aspect 32A, wherein the decorative element comprises wood.

Aspect 35A: The decorative unit of any one of aspects 32A-34A, wherein the decorative element is flexible and resilient.

Aspect 36A: The decorative unit of any one of aspects 32A-35A, wherein the acoustic article has no filler dispersed therethrough.

Aspect 37A: The decorative unit of aspect 36A, wherein the acoustic article consists essentially of nonwoven material and air dispersed therethrough.

Aspect 38A: The decorative unit of any one of aspects 31A-37A, wherein acoustic article comprises a plurality of fibers having a denier above 12.

Aspect 39A: The decorative unit of aspect 38A, wherein the denier is about 15.

Aspect 40A: The decorative unit of any one of aspects 31A-39A, wherein the acoustic article has a thickness from 0.7 mm to 25 mm.

Aspect 41A: The decorative unit of any one of aspects 31A-40A, wherein the acoustic article comprises a first plurality of fibers having a first melting point and a second plurality of fibers having a second melting point that is greater than the melting point of the first plurality of fibers.

Aspect 42A: The decorative unit of any one of aspects 31A-41A, wherein the acoustic article comprises a plurality of layers.

Aspect 43A: The decorative unit of aspect 42A, wherein the plurality of layers have different respective densities.

Aspect 44A: The decorative unit of any one of aspects 31A-43A, wherein the acoustic article comprises polyethylene, polypropylene, polyester, nylon, or a combination thereof.

Aspect 45A: The decorative unit of any one of aspects 31A-44A, wherein the acoustic article comprises a first layer and a second layer that is coupled to the first layer, wherein the first layer is disposed between the decorative element and the second layer.

Aspect 46A: The decorative unit of aspect 45A, wherein the first layer comprises a woven material, wherein the second layer comprises a nonwoven material, wherein the nonwoven material and woven material are integrally formed as a composite material.

Aspect 47A: The decorative unit of aspect 45A or aspect 46A, further comprising an adhesive disposed between the first layer and the decorative element.

Aspect 48A: The decorative unit of any one of aspects 31A-47, further comprising a barrier between the acoustic article and the decorative element, wherein the barrier is liquid impermeable and/or breathable.

Aspect 49A: The decorative unit of aspect 48A, further comprising a leveling material disposed between the barrier and the decorative element.

Aspect 50A: The decorative unit of any one of aspects 31A-49A, wherein the system is configured to achieve a High-frequency Impact Insulation Class (HIIC) rating of at least 65 in a lab test on a 6" concrete floor with no ceiling.

Aspect 51A: The decorative unit of aspect 50A, wherein the system is configured to achieve an HIIC rating of at least 68 in a lab test on a 6" concrete floor with no ceiling.

Aspect 52A: The decorative unit of any one of aspects 31A-51A, wherein the system is configured to achieve an Impact Insulation Class (IIC) rating of at least 58 in a lab test on a 6" concrete floor with no ceiling.

Aspect 53A: The decorative unit of any one of aspects 31A-52A, wherein the acoustic article has a density of at least 4.5 pounds per cubic foot.

Aspect 54A: The decorative unit of any one of aspects 31A-53A, wherein the acoustic article is compressible by 25% of the thickness when subject to a pressure from 2.1 lbf/in$^2$ to 10 lbf/in$^2$.

Aspect 55A: The decorative unit of any one of aspects 31A-54A, wherein the acoustic article is compressible by less than 15% when subject to a pressure of 2 lbf/in$^2$.

Aspect 56A: The decorative unit of any one of aspects 31A-55A, wherein the acoustic article is compressible by between 10% and 25% of the thickness when subject to a pressure of 2 lbf/in$^2$.

Aspect 57A: The system of any one of aspects 1A-26A, wherein the decorative element comprises a decorative portion and a substrate.

Aspect 58A: The system of aspect 57A, wherein the substrate of the decorative element comprises a plurality of layers.

Aspect 59A: The system of aspect 58A, wherein the plurality of layers comprise at least a first layer, a second layer, and a third layer, wherein the second layer is disposed between the first and third layers.

Aspect 60A: The system of aspect 59A, wherein the second layer is breathable.

Aspect 61A: The system of aspect 60A, wherein the first and third layers comprise at least one composite material or at least one engineered hardwood material.

Aspect 62A: A decorative element comprising:
a decorative portion; and
a substrate comprising at least a first layer, a second layer, and a third layer, wherein the second layer is disposed between the first and third layers, wherein the second layer is a breathable material.

Aspect 63A: The decorative element of aspect 62A, wherein the first and third layers comprise at least one composite material or at least one engineered hardwood material.

'B' Aspects

Aspect 1B: A system comprising:
a hard surface flooring material having a first side and an opposing second side; and
a base pad disposed on the opposing second side of the hard surface flooring material, wherein the base pad:
comprises a woven material, a non-woven material, or a combination thereof;
has a thickness of at least 0.4 mm; and
is compressible by less than 25% of the thickness when subjected to a pressure of 2 lbf/in$^2$.

Aspect 2B: The system of aspect 1B, wherein the hard surface flooring material comprises polymer.

Aspect 3B: The system of aspect 1B, wherein the hard surface flooring material comprises wood.

Aspect 4B: The system of aspect 1B, wherein the hard surface flooring material comprises cementitious panel subfloor.

Aspect 5B: The system of any one of the preceding 'B' aspects, wherein the hard surface flooring material is flexible and resilient.

Aspect 6B: The system of any one of the preceding 'B' aspects, wherein the base pad has no filler dispersed therethrough.

Aspect 7B: The system of aspect 6B, wherein the base pad consists essentially of nonwoven material and air dispersed therethrough.

Aspect 8B: The system of any one of the preceding 'B' aspects, wherein the base pad comprises a plurality of fibers having a denier above 12.

Aspect 9B: The system of aspect 8B, wherein the denier is about 15.

Aspect 10B: The system of any one of the preceding 'B' aspects, wherein the base pad has a thickness from 0.4 mm to 25 mm.

Aspect 11B: The system of any one of the preceding 'B' aspects, wherein the base pad comprises a first plurality of fibers having a first melting point and a second plurality of fibers having a second melting point that is greater than the melting point of the first plurality of fibers.

Aspect 12B: The system of any one of the preceding 'B' aspects, wherein the base pad comprises a plurality of layers.

Aspect 13B: The system of aspect 12B, wherein the plurality of layers have different respective densities.

Aspect 14B: The system of any one of the preceding 'B' aspects, wherein the base pad comprises polyethylene, polypropylene, polyester, nylon, or a combination thereof.

Aspect 15B: The system of any one of the preceding 'B' aspects, wherein the base pad comprises a first layer and a second layer that is coupled to the first layer, wherein the first layer is disposed between the hard surface flooring material and the second layer.

Aspect 16B: The system of aspect 15B, wherein the first layer comprises a woven material, wherein the second layer comprises a nonwoven material, wherein the nonwoven material and woven material are integrally formed as a composite material.

Aspect 17B: The system of aspect 15B or aspect 16B, further comprising an adhesive disposed between the first layer and the hard surface flooring material.

Aspect 18B: The system of any one of the preceding 'B' aspects, further comprising a barrier between the base pad and the hard surface flooring material, wherein the barrier is liquid impermeable and/or breathable.

Aspect 19B: The system of aspect 18B, further comprising a leveling material disposed between the barrier and the hard surface flooring material.

Aspect 20B: The system of any one of the preceding 'B' aspects, wherein the system is configured to achieve a High-frequency Impact Insulation Class (HIIC) rating of at least 65 in a lab test on a 6" concrete floor with no ceiling.

Aspect 21B: The system of aspect 20B, wherein the system is configured to achieve an HIIC rating of at least 68.

Aspect 22B: The system of any one of the preceding 'B' aspects, wherein the system is configured to achieve an Impact Insulation Class (IIC) rating of at least 58 in a lab test on a 6" concrete floor with no ceiling.

Aspect 23B: The system of any one of the preceding 'B' aspects, wherein the base pad has a density of at least 4.5 pounds per cubic foot.

Aspect 24B: The system of any one of the preceding 'B' aspects, wherein the base pad is compressible by 25% of the thickness when subject to a pressure from 2.1 lbf/in$^2$ to 20 lbf/in$^2$.

Aspect 25B: The system of any one of the preceding 'B' aspects, wherein the base pad is compressible by less than 15% when subject to a pressure of 2 lbf/in$^2$.

Aspect 26B: The system of any one of the preceding 'B' aspects, wherein the base pad is compressible by between 10% and 25% of the thickness when subject to a pressure of 2 lbf/in$^2$.

Aspect 27B: A method of installing the system as in any one of the preceding 'B' aspects.

Aspect 28B: The method of aspect 27B, wherein the method comprises placing an assembly comprising the hard surface flooring material coupled to the base pad on a subfloor surface.

Aspect 29B: The method of aspect 27B, wherein the method comprises:
placing the base pad on a subfloor surface; and
placing the hard surface flooring material on the base pad.

Aspect 30B: The method of aspect 29B, further comprising depositing an adhesive between the base pad and the hard surface flooring material.

Aspect 31B: A flooring element comprising:
a hard surface flooring material having a first side and an opposing second side;
a base pad coupled to the hard surface flooring material on the opposing second side of the hard surface flooring material, wherein the base pad:
comprises a woven material, a nonwoven material, or a combination thereof;
has a thickness of at least 0.4 mm; and
is compressible by less than 25% of the thickness when subject to a pressure of 2 lbf/in$^2$.

Aspect 32B: The flooring element of aspect 31B, wherein the hard surface flooring material comprises polymer.

Aspect 33B: The flooring element of aspect 31B, wherein the hard surface flooring material comprises wood.

Aspect 34B: The flooring element of any one of aspects 31B-33B, wherein the hard surface flooring material is flexible and resilient.

Aspect 35B: The flooring element of any one of aspects 31B-34B, wherein the base pad has no filler dispersed therethrough.

Aspect 36B: The flooring element of aspect 35B, wherein the base pad consists essentially of nonwoven material and air dispersed therethrough.

Aspect 37B: The flooring element of any one of aspects 31B-36B, wherein base pad comprises a plurality of fibers having a denier above 12.

Aspect 38B: The flooring element of aspect 37B, wherein the denier is about 15.

Aspect 39B: The flooring element of any one of aspects 31B-38B, wherein the base pad has a thickness from 0.7 mm to 25 mm.

Aspect 40B: The flooring element of any one of aspects 31B-39B, wherein the base pad comprises a first plurality of fibers having a first melting point and a second plurality of fibers having a second melting point that is greater than the melting point of the first plurality of fibers.

Aspect 41B: The flooring element of any one of aspects 31B-40B, wherein the base pad comprises a plurality of layers.

Aspect 42B: The flooring element of aspect 41B, wherein the plurality of layers have different respective densities.

Aspect 43B: The flooring element of any one of aspects 31B-42B, wherein the base pad comprises polyethylene, polypropylene, polyester, nylon, or a combination thereof.

Aspect 44B: The flooring element of any one of aspects 31B-43B, wherein the base pad comprises a first layer and a second layer that is coupled to the first layer, wherein the first layer is disposed between the hard surface flooring material and the second layer.

Aspect 45B: The flooring element of aspect 44B, wherein the first layer comprises a woven material, wherein the second layer comprises a nonwoven material, wherein the nonwoven material and woven material are integrally formed as a composite material.

Aspect 46B: The flooring element of aspect 44B or aspect 45B, further comprising an adhesive disposed between the first layer and the hard surface flooring material.

Aspect 47B: The flooring element of any one of aspects 31B-46B, further comprising a barrier between the base pad and the hard surface flooring material, wherein the barrier is liquid impermeable and/or breathable.

Aspect 48B: The flooring element of aspect 47B, further comprising a leveling material disposed between the barrier and the hard surface flooring material.

Aspect 49B: The flooring element of any one of aspects 31B-48B, wherein the system is configured to achieve a High-frequency Impact Insulation Class (HIIC) rating of at least 65 in a lab test on a 6" concrete floor with no ceiling.

Aspect 50B: The flooring element of aspect 49B, wherein the system is configured to achieve an HIIC rating of at least 68 in a lab test on a 6" concrete floor with no ceiling.

Aspect 51B: The flooring element of any one of aspects 31B-50B, wherein the system is configured to achieve an Impact Insulation Class (IIC) rating of at least 58 in a lab test on a 6" concrete floor with no ceiling.

Aspect 52B: The flooring element of any one of aspects 31B-51B, wherein the base pad has a density of at least 4.5 pounds per cubic foot.

Aspect 53B: The flooring element of any one of aspects 31B-52B, wherein the base pad is compressible by 25% of the thickness when subject to a pressure from 2.1 lbf/in$^2$ to 10 lbf/in$^2$.

Aspect 54B: The flooring element of any one of aspects 31B-53B, wherein the base pad is compressible by less than 15% when subject to a pressure of 2 lbf/in$^2$.

Aspect 55B: The flooring element of any one of aspects 31B-54B, wherein the base pad is compressible by between 10% and 25% of the thickness when subject to a pressure of 2 lbf/in$^2$.

Aspect 56B The system of any one of aspects 1B-26B, wherein the hard surface flooring material comprises a decorative portion and a substrate.

Aspect 57B: The system of aspect 56B, wherein the substrate of the hard surface flooring material comprises a plurality of layers.

Aspect 58B: The system of aspect 57B, wherein the plurality of layers comprise at least a first layer, a second layer, and a third layer, wherein the second layer is disposed between the first and third layers.

Aspect 59B: The system of aspect 58B, wherein the second layer is breathable.

Aspect 60B: The system of aspect 59B, wherein the first and third layers comprise at least one composite material or at least one engineered hardwood material.

Aspect 61B: A hard surface flooring material comprising:
a decorative portion; and
a substrate comprising at least a first layer, a second layer, and a third layer, wherein the second layer is disposed between the first and third layers, wherein the second layer is breathable.

Aspect 62B: The hard surface flooring material of aspect 61B, wherein the first and third layers comprise at least one composite material or at least one engineered hardwood material.

'C' Aspects

Aspect 1C: A system comprising:
a decorative element having a first side and an opposing second side, wherein the decorative element has a first surface on the first side and a second surface on the opposing second side;
an acoustic article disposed on the opposing second side of the decorative element, wherein the acoustic article:
comprises a resiliently compressible material;
has a thickness of at least 0.4 mm; and
is compressible by less than 25% of the thickness when subjected to a pressure of 2 lbf/in$^2$; and
a stiffening structure between the decorative element and the acoustic article.

Aspect 2C: The system of aspect 1C, wherein the stiffening structure consists of a single layer.

Aspect 3C: The system of aspect 1C, wherein the stiffening structure comprises a plurality of layers.

Aspect 4C: The system of aspect 3C, wherein the plurality of layers are laminated together.

Aspect 5C: The system of aspect 4C, wherein the plurality of layers comprise a layer of thermoplastic and a structural stabilizer.

Aspect 6C: The system of aspect 4C, wherein the plurality of layers comprise two thermoplastic layers.

Aspect 7C: The system of aspect 6C, wherein the plurality of layers further comprise a structural stabilizer laminated between the two thermoplastic layers.

Aspect 8C: The system of any one of aspects 1C-3C, wherein the stiffening structure comprises a rigid fabric.

Aspect 9C: The system of any one of aspects 1C-3C, wherein the stiffening structure comprises a membrane.

Aspect 10C: The system of any one of the preceding 'C' aspects, wherein the stiffening structure is coupled to the acoustic article.

Aspect 11C: The system of aspect 10C, wherein the stiffening structure is adhesively coupled to the acoustic article.

Aspect 12C: The system of aspect 10C, wherein the stiffening structure is bonded to the acoustic article.

Aspect 13C: The system of any one of the preceding 'C' aspects, wherein the decorative element is coupled to the stiffening structure.

Aspect 14C: The system of aspect 13C, wherein the decorative element is adhesively coupled to the stiffening structure.

Aspect 15C: The system of any one of aspects 1C-12C, wherein the decorative element is not coupled to the stiffening structure.

Aspect 16C: The system of any one of the preceding 'C' aspects, wherein the stiffening structure comprises a first plurality of fibers having a first melting point, wherein the acoustic article comprises a second plurality of fibers having a second melting point that is higher than the first melting point, wherein at least a portion of the first plurality of fibers are melted to form the stiffening structure.

Aspect 17C: The system of any one of the preceding 'C' aspects, wherein the resiliently compressible material of the acoustic article comprises an entangled fiber structure.

Aspect 18C: The system of aspect 17C, wherein the entangled fiber structure comprises a needle bonded fabric.

Aspect 19C: The system of any one of the preceding 'C' aspects, wherein the resiliently compressible material of the acoustic article comprises foam, rubber, or composite.

Aspect 20C: The system of any one of the preceding 'C' aspects, wherein the stiffening structure and the acoustic article have respective material properties such that the stiffening structure and the acoustic article cooperate to provide a stiffness of at least 40,000 microjoules/meter when measured in accordance with ASTM D1388-18.

Aspect 21C: The system of any one of the preceding 'C' aspects, wherein the stiffening structure and the acoustic article have respective material properties such that the stiffening structure and the acoustic article cooperate to provide a stiffness of at least 100,000 microjoules/meter when measured in accordance with ASTM D1388-18.

Aspect 22C: The system of any one of the preceding 'C' aspects, wherein the stiffening structure and the acoustic article have respective material properties such that the stiffening structure and the acoustic article cooperate to provide a stiffness of 2 times a stiffness of the acoustic article alone, when measured in accordance with ASTM D1388-18.

Aspect 23C: The system of any one of aspects 1C-22C, wherein the decorative element comprises polymer.

Aspect 24C: The system of any one of aspects 1C-22C, wherein the decorative element comprises wood.

Aspect 25C: The system of any one of aspects 1C-22C, wherein the decorative element comprises cementitious panel subfloor.

Aspect 26C: The system of any one of the preceding 'C' aspects, wherein the decorative element is flexible and resilient.

Aspect 27C: The system of any one of the preceding 'C' aspects, wherein the acoustic article has no filler dispersed therethrough.

Aspect 28C: The system of aspect 27C, wherein the acoustic article consists essentially of nonwoven material and air dispersed therethrough.

Aspect 29C: The system of aspect any one of the preceding 'C' aspects, wherein the acoustic article comprises a plurality of fibers having a denier above 12.

Aspect 30C: The system of aspect 29C, wherein the denier is about 15.

Aspect 31C: The system of any one of the preceding 'C' aspects, wherein the acoustic article has a thickness from 0.4 mm to 25 mm.

Aspect 32C: The system of any one of the preceding 'C' aspects, wherein the acoustic article comprises a first plurality of fibers having a first melting point and a second plurality of fibers having a second melting point that is greater than the melting point of the first plurality of fibers.

Aspect 33C: The system of any one of the preceding 'C' aspects, wherein the acoustic article comprises a plurality of layers.

Aspect 34C: The system of aspect 33C, wherein the plurality of layers have different respective densities.

Aspect 35C: The system of any one of the preceding 'C' aspects, wherein the acoustic article comprises polyethylene, polypropylene, polyester, nylon, or a combination thereof.

Aspect 36C: The system of any one of the preceding 'C' aspects, wherein the acoustic article comprises a first layer and a second layer that is coupled to the first layer, wherein the first layer is disposed between the decorative element and the second layer.

Aspect 37C: The system of aspect 36C, wherein the first layer comprises a woven material, wherein the second layer comprises a nonwoven material, wherein the nonwoven material and woven material are integrally formed as a composite material.

Aspect 38C: The system of aspect 37C, further comprising an adhesive disposed between the first layer and the decorative element.

Aspect 39C: The system of any one of the preceding 'C' aspects, further comprising a barrier between the acoustic article and the decorative element, wherein the barrier is liquid impermeable and/or breathable.

Aspect 40C: The system of aspect 39C, further comprising a leveling material disposed between the barrier and the decorative element.

Aspect 41C: The system of any one of the preceding 'C' aspects, wherein the system is configured to achieve a High-frequency Impact Insulation Class (HIIC) rating of at least 63 in a lab test on a 6" concrete floor with no ceiling.

Aspect 42C: The system of aspect 41C, wherein the system is configured to achieve an HIIC rating of at least 64.

Aspect 43C: The system of any one of the preceding 'C' aspects, wherein the system is configured to achieve an Impact Insulation Class (IIC) rating of at least 58 in a lab test on a 6" concrete floor with no ceiling.

Aspect 44C: The system of any one of the preceding 'C' aspects, wherein the acoustic article has a density of at least 4.5 pounds per cubic foot.

Aspect 45C: The system of any one of the preceding 'C' aspects, wherein the acoustic article is compressible by 25% of the thickness when subject to a pressure from 2.1 lbf/in$^2$ to 20 lbf/in$^2$.

Aspect 46C: The system of any one of the preceding 'C' aspects, wherein the acoustic article is compressible by less than 15% when subject to a pressure of 2 lbf/in$^2$.

Aspect 47C: The system of any one of the preceding 'C' aspects, wherein the acoustic article is compressible by between 10% and 25% of the thickness when subject to a pressure of 2 lbf/in$^2$.

Aspect 48C: The system of any one of the preceding 'C' aspects, wherein the acoustic article is disposed on the opposing second side of the decorative element.

Aspect 49C: A method comprising:
  installing the system as in any one of the preceding 'C' aspects onto a subfloor surface.

Aspect 50C: The method of aspect 49C, wherein the method comprises placing an assembly comprising the decorative element coupled to the acoustic article, with the stiffening structure disposed between the decorative element and the acoustic article, on the subfloor surface.

Aspect 51C: The method of aspect 49C, wherein the method comprises:
  placing the acoustic article, with the stiffening structure coupled thereto, on the subfloor surface; and
  placing the decorative element on the stiffening structure.

Aspect 52C: The method of aspect 51C, further comprising depositing an adhesive between the stiffening structure and the decorative element.

Aspect 53C: A decorative unit comprising:
  a decorative element having a first side and an opposing second side, wherein the decorative element has a first surface on the first side and a second surface on the opposing second side;
  an acoustic article coupled to the decorative element on the opposing second side of the decorative element, wherein the acoustic article:
    comprises a resiliently compressible material;
    has a thickness of at least 0.4 mm; and
    is compressible by less than 25% of the thickness when subject to a pressure of 2 lbf/in$^2$; and
  a stiffening structure between the decorative element and the acoustic article.

Aspect 54C: The decorative unit of aspect 53C, wherein the decorative element comprises polymer.

Aspect 55C: The decorative unit of aspect 53C, wherein the decorative element comprises wood.

Aspect 56C: The decorative unit of aspect 53C, wherein the decorative element is flexible and resilient.

Aspect 57C: The decorative unit of aspect 53C, wherein the acoustic article has no filler dispersed therethrough.

Aspect 58C: The decorative unit of aspect 57C, wherein the acoustic article consists essentially of nonwoven material and air dispersed therethrough.

Aspect 59C: The decorative unit of aspect 53C, wherein acoustic article comprises a plurality of fibers having a denier above 12.

Aspect 60C: The decorative unit of aspect 59C, wherein the denier is about 15.

Aspect 61C: The decorative unit of aspect 53C, wherein the acoustic article has a thickness from 0.7 mm to 25 mm.

Aspect 62C: The decorative unit of aspect 53C, wherein the acoustic article comprises a first plurality of fibers having a first melting point and a second plurality of fibers having a second melting point that is greater than the melting point of the first plurality of fibers.

Aspect 63C: The decorative unit of aspect 53C, wherein the acoustic article comprises a plurality of layers.

Aspect 64C: The decorative unit of aspect 53C, wherein the plurality of layers have different respective densities.

Aspect 65C: The decorative unit of aspect 53C, wherein the acoustic article comprises polyethylene, polypropylene, polyester, nylon, or a combination thereof.

Aspect 66C: The decorative unit of aspect 53C, wherein the acoustic article comprises a first layer and a second layer that is coupled to the first layer, wherein the first layer is disposed between the decorative element and the second layer.

Aspect 67C: The decorative unit of aspect 66C, wherein the first layer comprises a woven material, wherein the second layer comprises a nonwoven material, wherein the nonwoven material and woven material are integrally formed as a composite material.

Aspect 68C: The decorative unit of aspect 66C, further comprising an adhesive disposed between the first layer and the decorative element.

Aspect 69C: The decorative unit of aspect 68C, further comprising a barrier between the acoustic article and the decorative element, wherein the barrier is liquid impermeable and/or breathable.

Aspect 70C: The decorative unit of aspect 69C, further comprising a leveling material disposed between the barrier and the decorative element.

Aspect 71C: The decorative unit of aspect 53C, wherein the system is configured to achieve a High-frequency Impact Insulation Class (HIIC) rating of at least 63 in a lab test on a 6" concrete floor with no ceiling.

Aspect 72C: The decorative unit of aspect 71C, wherein the system is configured to achieve an HIIC rating of at least 64 in a lab test on a 6" concrete floor with no ceiling.

Aspect 73C: The decorative unit of aspect 53C, wherein the system is configured to achieve an Impact Insulation Class (IIC) rating of at least 58 in a lab test on a 6" concrete floor with no ceiling.

Aspect 74C: The decorative unit of aspect 53C, wherein the acoustic article has a density of at least 4.5 pounds per cubic foot.

Aspect 75C: The decorative unit of aspect 53C, wherein the acoustic article is compressible by 25% of the thickness when subject to a pressure from 2.1 lbf/in$^2$ to 10 lbf/in$^2$.

Aspect 76C: The decorative unit of aspect 51C, wherein the acoustic article is compressible by less than 15% when subject to a pressure of 2 lbf/in$^2$.

Aspect 77C: The decorative unit of aspect 53C, wherein the acoustic article is compressible by between 10% and 25% of the thickness when subject to a pressure of 2 lbf/in$^2$.

Aspect 78C: A subsurface article comprising:
an acoustic article comprising a resiliently compressible material, wherein the acoustic article:
has a thickness of at least 0.4 mm; and
is compressible by less than 25% of the thickness when subjected to a pressure of 2 lbf/in$^2$,
wherein the acoustic article has a first side; and
a stiffening structure positioned on the first side of the acoustic article.

Aspect 79C: The subsurface article of aspect 78C, wherein the stiffening structure consists of a single layer.

Aspect 80C: The subsurface article of aspect 78C, wherein the stiffening structure comprises a plurality of layers.

Aspect 81C: The subsurface article of aspect 80C, wherein the plurality of layers are laminated together.

Aspect 82C: The subsurface article of aspect 81C, wherein the plurality of layers comprise a layer of thermoplastic and a structural stabilizer.

Aspect 83C: The subsurface article of aspect 81C, wherein the plurality of layers comprise two thermoplastic layers.

Aspect 84C: The subsurface article of aspect 83C, wherein the plurality of layers further comprise a structural stabilizer laminated between the two thermoplastic layers.

Aspect 85C: The subsurface article of any one of aspects 78C-80C, wherein the stiffening structure comprises a rigid fabric.

Aspect 86C: The subsurface article of any one of aspects 78C-80C, wherein the stiffening structure comprises a membrane.

Aspect 87C: The subsurface article of any one of aspects 78C-86C, wherein the stiffening structure is coupled to the acoustic article.

Aspect 88C: The subsurface article of aspect 87C, wherein the stiffening structure is adhesively coupled to the acoustic article.

Aspect 89C: The subsurface article of aspect 87C, wherein the stiffening structure is bonded to the acoustic article.

Aspect 90C: The subsurface article of any one of aspects 78C-89C, wherein the stiffening structure comprises a first plurality of fibers having a first melting point, wherein the acoustic article comprises a second plurality of fibers having a second melting point that is higher than the first melting point, wherein at least a portion of the first plurality of fibers are melted to form the stiffening structure.

Aspect 91C: The subsurface article of any one of aspects 78C-90C, wherein the resiliently compressible material of the acoustic article comprises an entangled fiber structure.

Aspect 92C: The subsurface article of aspect 91C, wherein the entangled fiber structure comprises a needle bonded fabric.

Aspect 93C: The subsurface article of any one of aspects 78C-92C, wherein the resiliently compressible material of the acoustic article comprises foam, rubber, or composite.

Aspect 94C: The subsurface article of any one of aspects 78C-93C, wherein the stiffening structure and the acoustic article have respective material properties such that the stiffening structure and the acoustic article cooperate to provide a stiffness of at least 40,000 microjoules/meter when measured in accordance with ASTM D1388-18.

Aspect 95C: The subsurface article of any one of aspects 78C-94C, wherein the stiffening structure and the acoustic article have respective material properties such that the stiffening structure and the acoustic article cooperate to provide a stiffness of at least 1000,000 microjoules/meter when measured in accordance with ASTM D1388-18.

Aspect 96C: The subsurface article of any one of aspects 78C-95C, wherein the stiffening structure and the acoustic article have respective material properties such that the stiffening structure and the acoustic article cooperate to provide a stiffness of 2 times a stiffness of the acoustic article alone, when measured in accordance with ASTM D1388-18.

Although the foregoing invention has been described in some detail by way of illustration and example for purposes of clarity of understanding, certain changes and modifications may be practiced within the scope of the appended claims.

What is claimed is:

1. A flooring system comprising:
   a decorative element having a first side and an opposing second side, wherein the decorative element has a first surface on the first side and a second surface on the opposing second side;
   an acoustic article coupled to the opposing second side of the decorative element, wherein the acoustic article:
   comprises a resiliently compressible material;
   has a thickness from at least 0.4 mm to about 7 mm; and
   is compressible from about 5% to about 25% of the thickness when subjected to a pressure of 2 lbf/in$^2$; and
   a stiffening structure between the decorative element and the acoustic article.

2. The flooring system of claim 1, wherein the stiffening structure consists of a single layer.

3. The flooring system of claim 1, wherein the stiffening structure comprises a plurality of layers.

4. The flooring system of claim 3, wherein the plurality of layers are laminated together.

5. The flooring system of claim 4, wherein the plurality of layers comprise a layer of thermoplastic and a structural stabilizer.

6. The flooring system of claim 4, wherein the plurality of layers comprise two thermoplastic layers.

7. The flooring system of claim 6, wherein the plurality of layers further comprise a structural stabilizer laminated between the two thermoplastic layers.

8. The flooring system of claim 1, wherein the stiffening structure comprises a thermoplastic.

9. The flooring system of claim 1, wherein the stiffening structure comprises a polyolefin, a vinyl, a rubber, or a polyester, or a combination thereof.

10. The flooring system of claim 1, wherein the density of the stiffening structure has a first density and the acoustic article has a second density, wherein the first density is at least 1.5 times the second density of the acoustic article.

11. The flooring system of claim 1, wherein the resiliently compressible material comprises an entangled fiber structure, foam, rubber, composite, or cork, or a combination thereof.

12. The flooring system of claim 1, wherein the stiffening structure and the acoustic article have respective material properties such that the stiffening structure and the acoustic article cooperate to provide a stiffness of at least 40,000 microjoules/meter when measured in accordance with ASTM D1388-18.

13. A decorative unit comprising:
   a decorative element having a first side and an opposing second side, wherein the decorative element has a first surface on the first side and a second surface on the opposing second side;
   an acoustic article coupled to the decorative element on the opposing second side of the decorative element, wherein the acoustic article:
   comprises a resiliently compressible material;
   has a thickness from at least 0.4 mm to about 7 mm; and
   is compressible from about 5% to about 25% of the thickness when subject to a pressure of 2 lbf/in$^2$; and
   a stiffening structure between the decorative element and the acoustic article.

14. The decorative unit of claim 13, wherein the resiliently compressible material comprises an entangled fiber structure, foam, rubber, composite, or cork, or a combination thereof.

15. The decorative unit of claim 13, wherein the stiffening structure comprises a thermoplastic.

16. A subsurface article comprising:
   an acoustic article comprising a resiliently compressible material, wherein the acoustic article:
   has a thickness from at least 0.4 mm to about 7 mm; and
   is compressible from about 5% to about 25% of the thickness when subjected to a pressure of 2 lbf/in$^2$,
   wherein the acoustic article has a first side; and
   a stiffening structure coupled to the first side of the acoustic article,
   wherein the stiffening structure and the acoustic article have respective material properties such that the stiffening structure and the acoustic article cooperate to provide a stiffness of at least 40,000 microjoules/meter when measured in accordance with ASTM D1388-18.

17. The subsurface article of claim 16, wherein the stiffening structure consists of a single layer.

18. The subsurface article of claim 16, wherein the stiffening structure comprises a plurality of layers.

19. The subsurface article of claim 18, wherein the plurality of layers comprise a layer of the thermoplastic and a structural stabilizer.

20. The subsurface article of claim 18, wherein the plurality of layers comprise two thermoplastic layers.

21. The subsurface article of claim 16, wherein the resiliently compressible material comprises an entangled fiber structure, foam, rubber, composite, or cork, or a combination thereof.

22. The subsurface article of claim 16, wherein the stiffening structure comprises a thermoplastic.

23. A floor panel comprising:
   a decorative portion having a first side and an opposing second side, wherein the decorative portion has a first surface on the first side and a second surface on the opposing second side;
   an acoustic article coupled to the opposing second side of the decorative portion, wherein the acoustic article:
   comprises a resiliently compressible material;
   has a thickness from at least 0.4 mm to about 7 mm; and
   is compressible from about 5% to about 25% of the thickness when subjected to a pressure of 2 lbf/in$^2$; and
   a substrate between the decorative portion and the acoustic article.

24. The floor panel of claim 23, wherein the decorative portion comprises an image layer, a wear layer, or a scratch layer, or a combination thereof.

25. The floor panel of claim 23, wherein the substrate comprises a composite material.

26. The floor panel of claim 23, wherein the floor panel is a luxury vinyl tile, a luxury vinyl plank, wood plastic composite panel, stone plastic composite panel, or magnesium oxide composite panel.

27. The floor panel of claim 23, wherein the substrate has a thickness from about 2 mm to about 12 mm.

28. The floor panel of claim 23, wherein the substrate comprises a plurality of layers.

29. The floor panel of claim 23, wherein the resiliently compressible material comprises an entangled fiber structure, foam, rubber, composite, or cork, or a combination thereof.

30. The floor panel of claim 23, wherein the resiliently compressible material is a non-woven resiliently compressible material.

* * * * *